(12) United States Patent
Rahman et al.

(10) Patent No.: US 11,677,451 B2
(45) Date of Patent: Jun. 13, 2023

(54) METHOD AND APPARATUS FOR MULTIPLEXING PARTIAL CSI

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/809,884

(22) Filed: Jun. 29, 2022

(65) Prior Publication Data

US 2022/0360308 A1 Nov. 10, 2022

Related U.S. Application Data

(63) Continuation of application No. 17/028,898, filed on Sep. 22, 2020, now Pat. No. 11,387,884.

(60) Provisional application No. 63/076,140, filed on Sep. 9, 2020, provisional application No. 62/909,090, filed on Oct. 1, 2019.

(51) Int. Cl.
*H04B 7/06* (2006.01)
*H04L 5/00* (2006.01)
*H04B 7/0456* (2017.01)
*H04W 72/21* (2023.01)

(52) U.S. Cl.
CPC ......... *H04B 7/0626* (2013.01); *H04B 7/0639* (2013.01); *H04L 5/0057* (2013.01)

(58) Field of Classification Search
CPC .... H04B 7/0626; H04B 7/0639; H04B 7/063; H04B 7/0645; H04B 7/0456; H04L 5/0057; H04L 5/005; H04W 72/0453; H04W 72/21
See application file for complete search history.

(56) References Cited

U.S. PATENT DOCUMENTS

| 2019/0165896 A1* | 5/2019 | Huang | H04L 5/0053 |
| 2020/0235796 A1* | 7/2020 | Wu | H04L 1/003 |
| 2022/0006581 A1* | 1/2022 | Yamada | H04W 72/1273 |

* cited by examiner

*Primary Examiner* — Harry H Kim

(57) ABSTRACT

A method for operating a UE for CSI reporting comprises receiving configuration information for a CSI report, where the configuration information configures a PMI codebook and partitions the PMI codebook into first and second PMI subsets respectively indicating first and second subsets of a set of components S to represent $N_3$ precoding matrices; determining, based on the configuration information, the CSI report comprising first and second CSI parts, the second CSI part including the second PMI subset and partitioned into N groups; selecting M groups from the N groups of the second CSI part based on a resource allocation for transmission of UCI, where $M \in \{1, \ldots, N\}$; and transmitting, over an UL channel, the UCI including a first UCI part and a second UCI part, the first UCI part including the first CSI part and the second UCI part including the M groups from the N groups of the second CSI part.

20 Claims, 16 Drawing Sheets

METHOD AND APPARATUS FOR MULTIPLEXING PARTIAL CSI

CROSS-REFERENCE TO RELATED APPLICATION(S) AND CLAIM OF PRIORITY

This application is a continuation of U.S. patent application Ser. No. 17/028,898, filed on Sep. 22, 2020, which claims priority to U.S. Provisional Patent Application No. 62/909,090, filed on Oct. 1, 2019, and U.S. Provisional Patent Application No. 63/076,140, filed on Sep. 9, 2020. The content of the above-identified patent documents is incorporated herein by reference.

TECHNICAL FIELD

The present disclosure relates generally to wireless communication systems and more specifically to channel state information (CSI) reporting and multiplexing.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses for CSI reporting and multiplexing in a wireless communication system. In one embodiment, a UE for CSI reporting in a wireless communication system is provided. The UE includes a transceiver configured to receive configuration information for a CSI report, wherein the configuration information configures a precoding matrix indicator (PMI) codebook and partitions the PMI codebook into first and second PMI subsets respectively indicating first and second subsets of a set of components S to represent $N_3$ precoding matrices, where $N_3 \geq 1$. The UE further includes a processor operably connected to the transceiver. The processor is configured to determine, based on the configuration information, the CSI report comprising a first CSI part and a second CSI part, the second CSI part including the second PMI subset and partitioned into N groups, where $N \geq 1$; and select M groups from the N groups of the second CSI part based on a resource allocation for transmission of uplink control information (UCI), where $M \in \{1, \ldots, N\}$. The transceiver is further configured to transmit, over an uplink (UL) channel, the UCI including a first UCI part and a second UCI part, the first UCI part including the first CSI part and the second UCI part including the M groups from the N groups of the second CSI part.

In another embodiment, a BS in a wireless communication system is provided. The BS includes a processor configured to generate configuration information for a channel state information (CSI) report, wherein: the configuration information configures a precoding matrix indicator (PMI) codebook and partitions the PMI codebook into first and second PMI subsets respectively indicating first and second subsets of a set of components S to represent $N_3$ precoding matrices, where $N_3 \geq 1$, and the CSI report comprises a first CSI part and a second CSI part, the second CSI part including the second PMI subset and partitioned into N groups, where $N \geq 1$. The BS further includes a transceiver operably connected to the processor. The transceiver is configured to transmit the CSI configuration information for the CSI report, and receive, over an uplink (UL) channel, uplink control information (UCI), the UCI including a first UCI part and a second UCI part, the first UCI part including the first CSI part and the second UCI part including M groups from the N groups of the second CSI part, wherein the M groups from the N groups of the second CSI part are selected based on a resource allocation for transmission of the UCI, where $M \in \{1, \ldots, N\}$.

In yet another embodiment, a method for operating a UE for CSI reporting in a wireless communication system is provided. The method comprises receiving configuration information for a CSI report, wherein the configuration information configures a precoding matrix indicator (PMI) codebook and partitions the PMI codebook into first and second PMI subsets respectively indicating first and second subsets of a set of components S to represent $N_3$ precoding matrices, where $N_3 \geq 1$; determining, based on the configuration information, the CSI report comprising a first CSI part and a second CSI part, the second CSI part including the second PMI subset and partitioned into N groups, where $N \geq 1$; selecting M groups from the N groups of the second CSI part based on a resource allocation for transmission of uplink control information (UCI), where $M \in \{1, \ldots, N\}$; and transmitting, over an uplink (UL) channel, the UCI including a first UCI part and a second UCI part, the first UCI part including the first CSI part and the second UCI part including the M groups from the N groups of the second CSI part.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
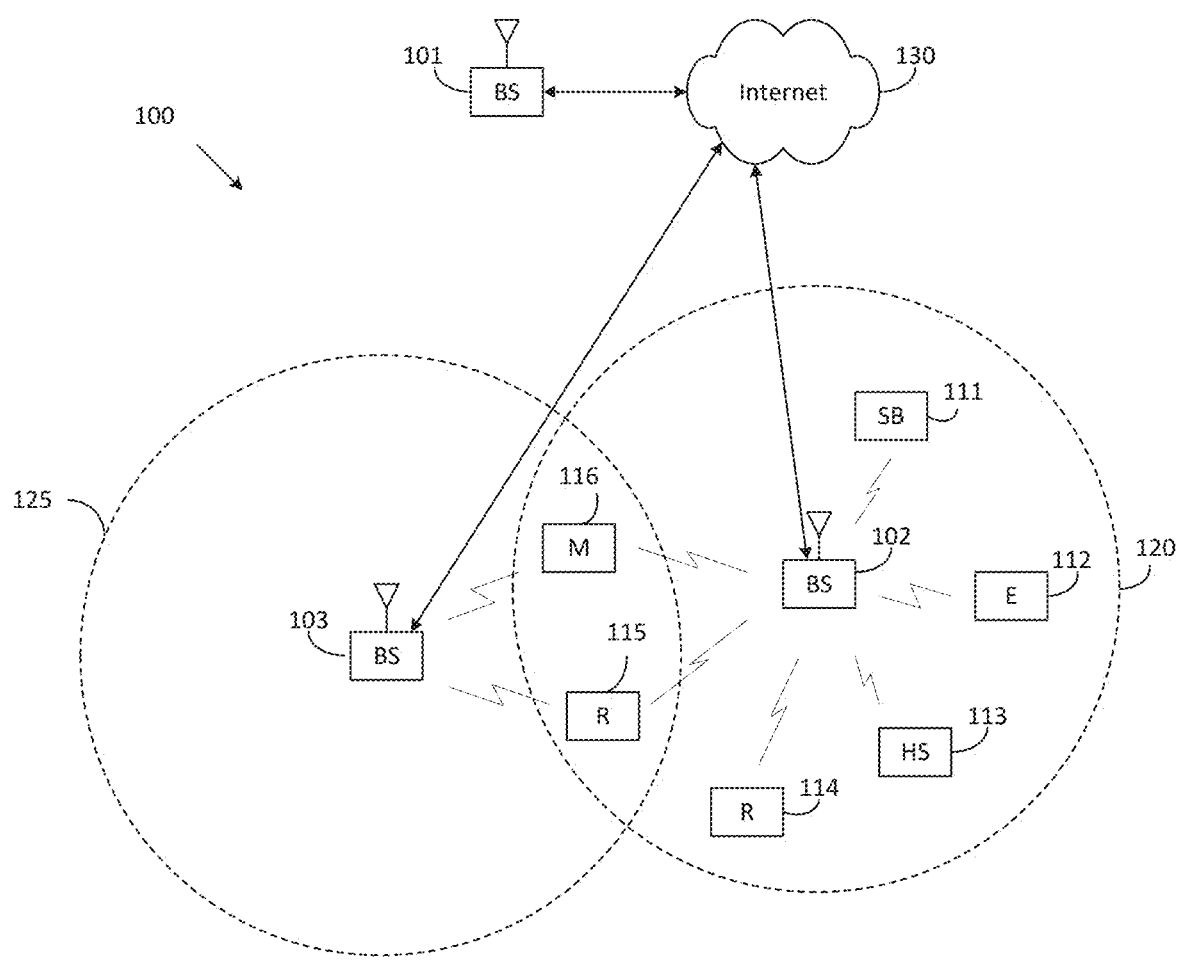
FIG. 1 illustrates an example wireless network according to embodiments of the present disclosure.

FIG. 1 through FIG. 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.2.0, "E-UTRA, Physical channels and modulation" (herein "REF 1"); 3GPP TS 36.212 v16.2.0, "E-UTRA, Multiplexing and Channel coding" (herein "REF 2"); 3GPP TS 36.213 v16.2.0, "E-UTRA, Physical Layer Procedures" (herein "REF 3"); 3GPP TS 36.321 v16.2.0, "E-UTRA, Medium Access Control (MAC) protocol specification" (herein "REF 4"); 3GPP TS 36.331 v16.2.0, "E-UTRA, Radio Resource Control (RRC) protocol specification" (herein "REF 5"); 3GPP TR 22.891 v14.2.0 (herein "REF 6"); 3GPP TS 38.212 v16.2.0, "E-UTRA, NR, Multiplexing and channel coding" (herein "REF 7"); 3GPP TS 38.214 v16.2.0, "E-UTRA, NR, Physical layer procedures for data" (herein "REF 8"); and 3GPP TS 38.213 v16.2.0, "E-UTRA, NR, Physical Layer Procedures for control" (herein "REF 9").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

Figure 2:
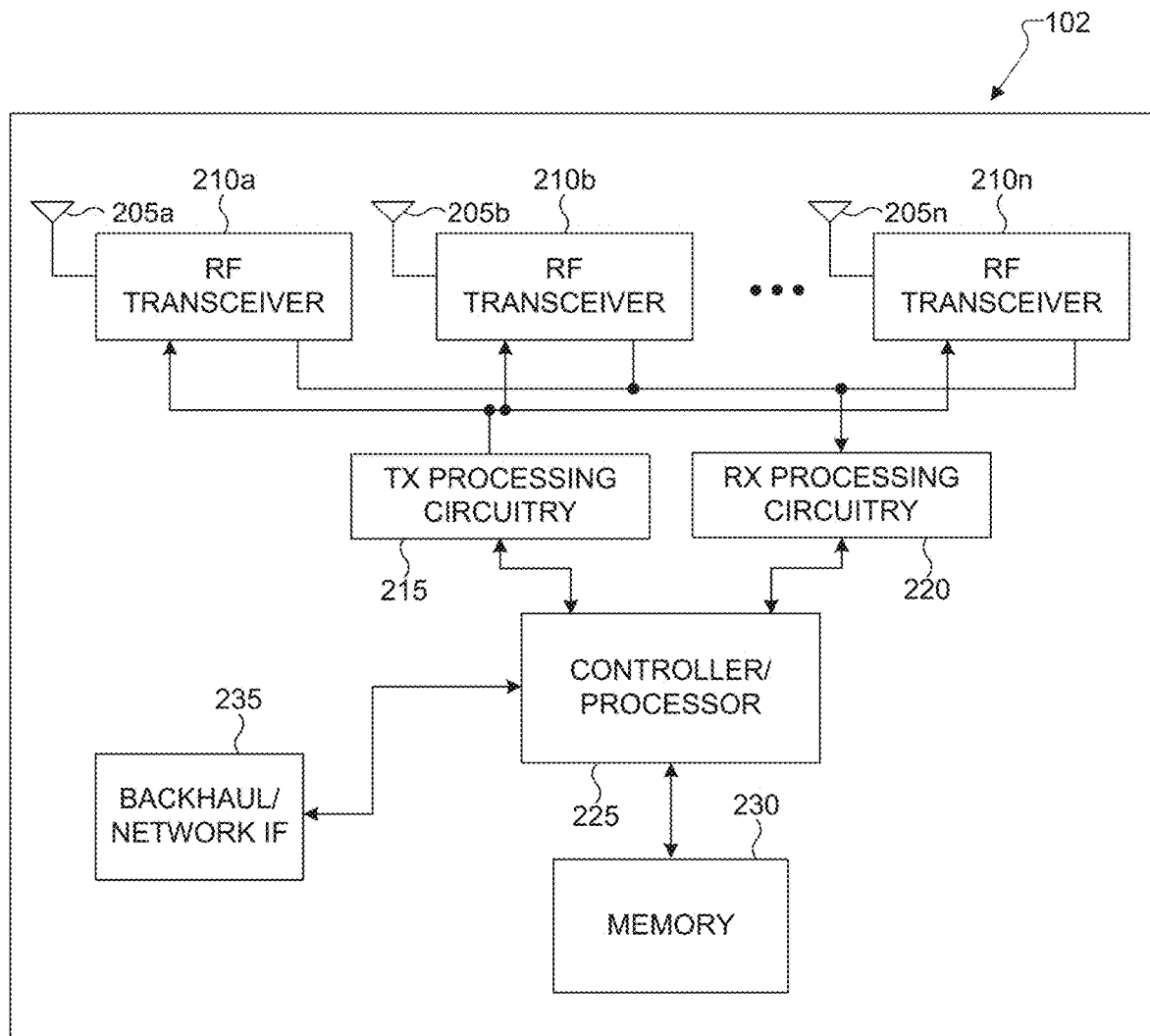
FIG. 2 illustrates an example gNB according to embodiments of the present disclosure.
Figure 3:
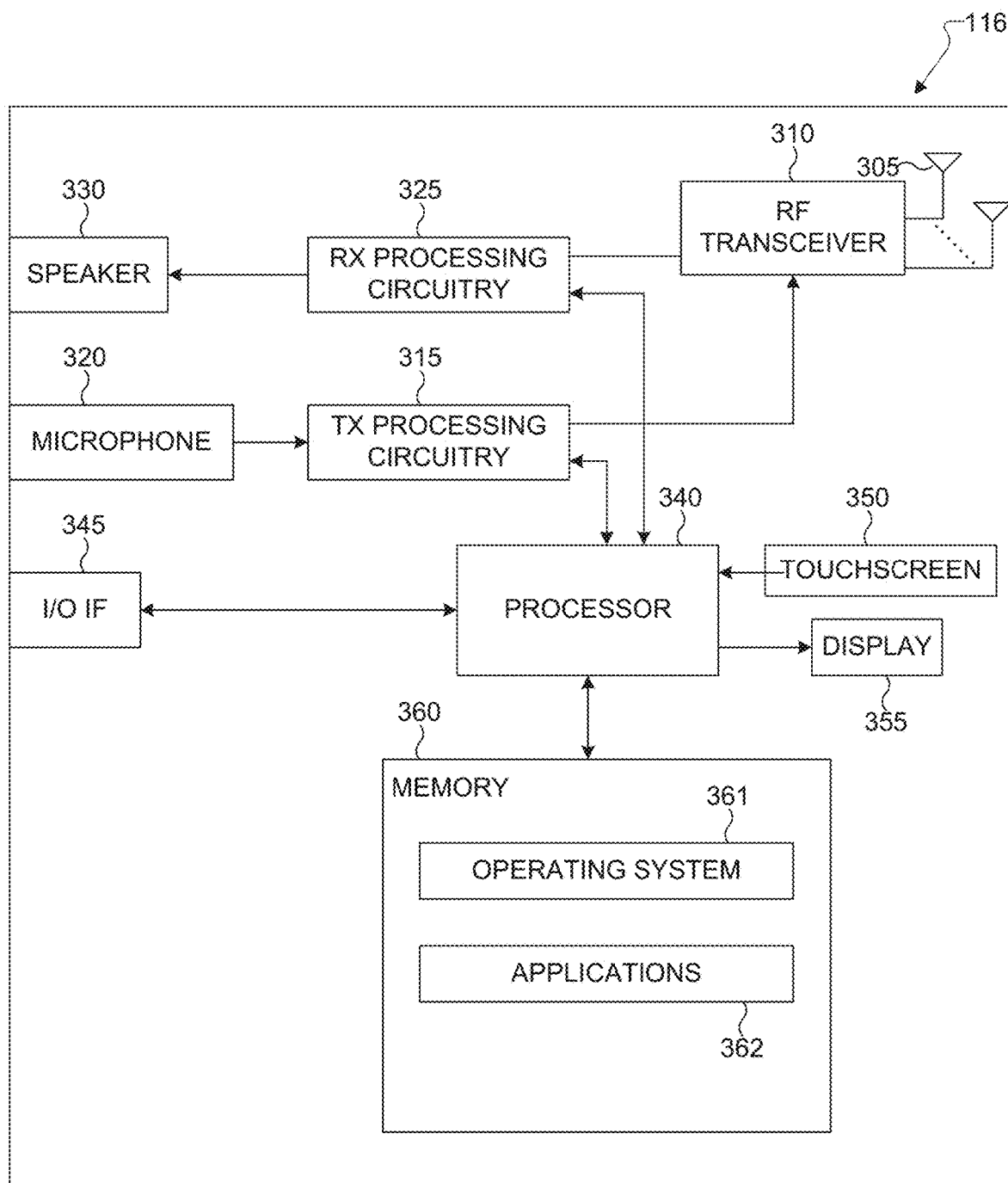
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for CSI reporting and multiplexing in a wireless communication system. In certain embodiments, and one or more of the gNBs 101-103 includes circuitry, programing, or a combination thereof, for CSI acquisition in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX)

processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for determining a CSI report comprising a first CSI part and a second CSI part based on received configuration information, wherein the configuration information configures a precoding matrix indicator (PMI) codebook and partitions the PMI codebook into first and second PMI subsets respectively indicating first and second subsets of a set of components S to represent $N_3$ precoding matrices, where $N_3 \geq 1$, the second CSI part including the second PMI subset and partitioned into N groups, where $N \geq 1$, selecting M groups from the N groups of the second CSI part based on a resource allocation for transmission of uplink control information (UCI), where $M \in \{1, \ldots, N\}$; and transmitting, over an uplink (UL) channel, the UCI including a first UCI part and a second UCI part, the first UCI part including the first CSI part and the second UCI part including the M groups from the N groups of the second CSI part. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
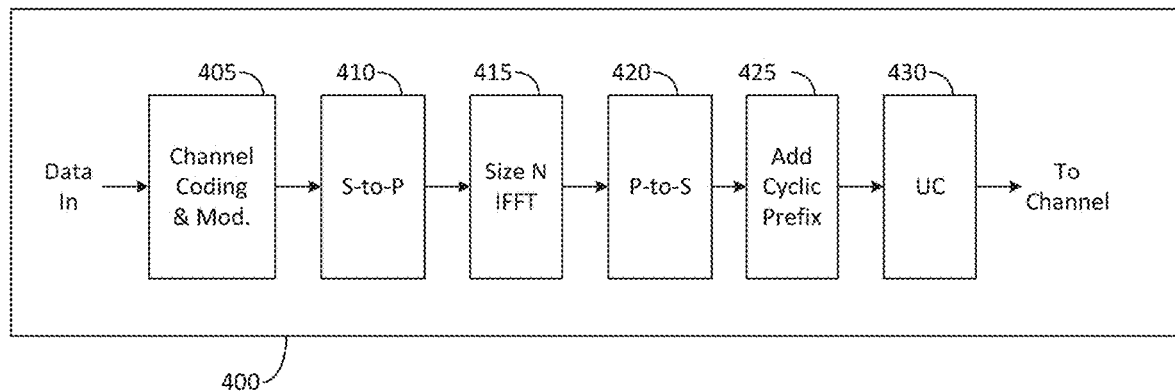
FIG. 4A illustrates a high-level diagram of an orthogonal frequency division multiple access transmit path according to embodiments of the present disclosure.
Figure 4B:
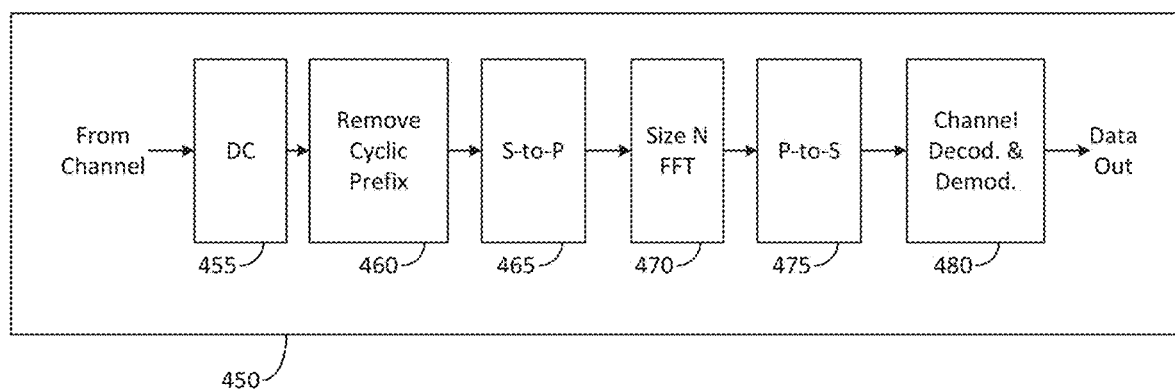
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2\cdot(N_{symb}^{UL}-1)-N_{SRS}$, where $N_{SRS}=1$ if a last subframe symbol is used to transmit SRS and $N_{SRS}=0$ otherwise.

Figure 5:
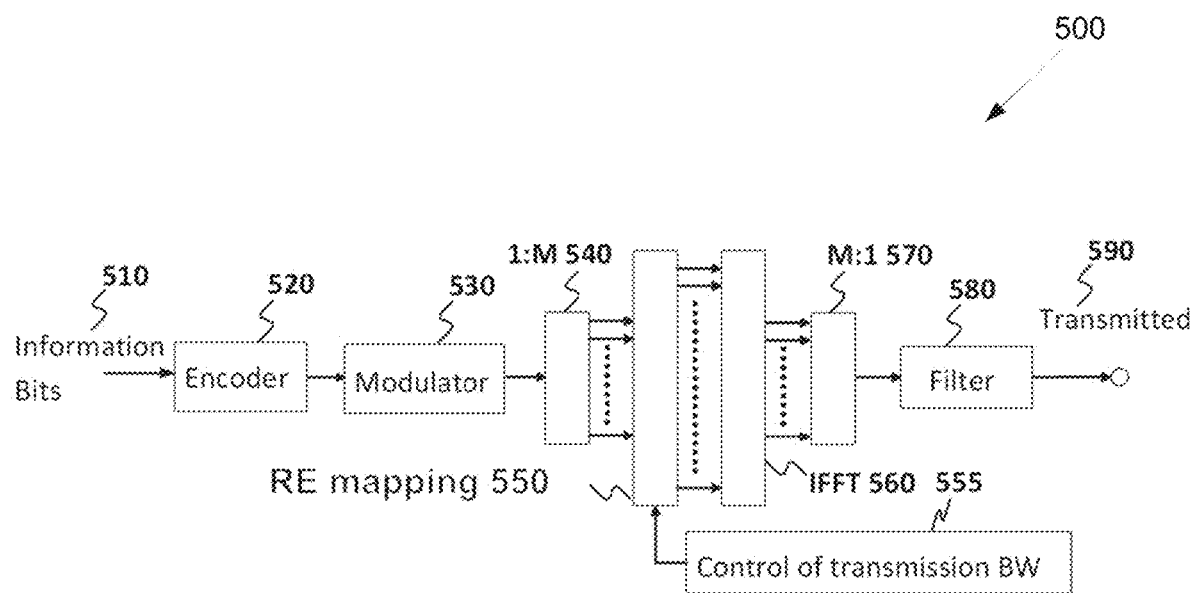
FIG. 5 illustrates an example of a transmitter block diagram for a PDSCH in a subframe according to embodiments of the present disclosure.

FIG. 5 illustrates an example transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
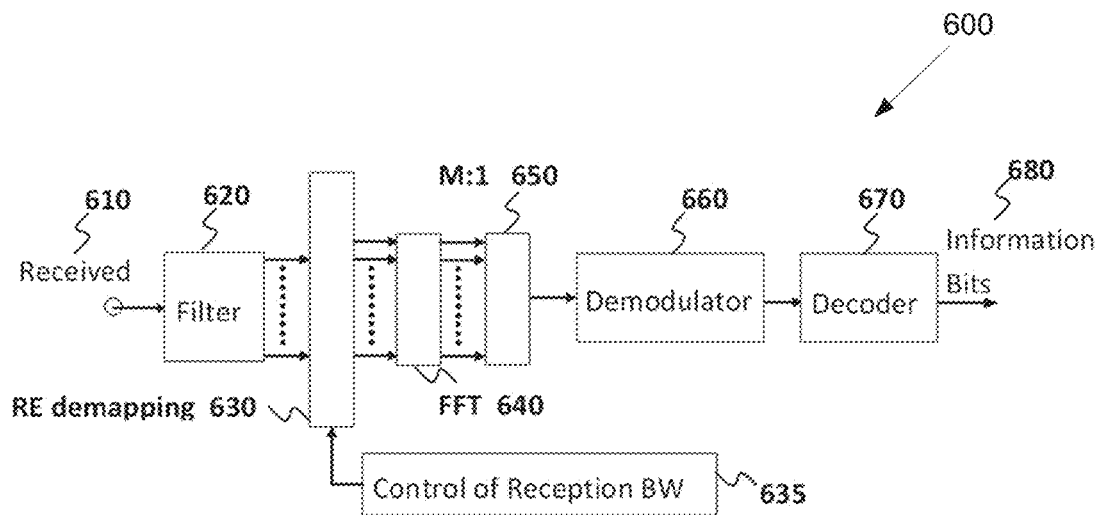
FIG. 6 illustrates an example of a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
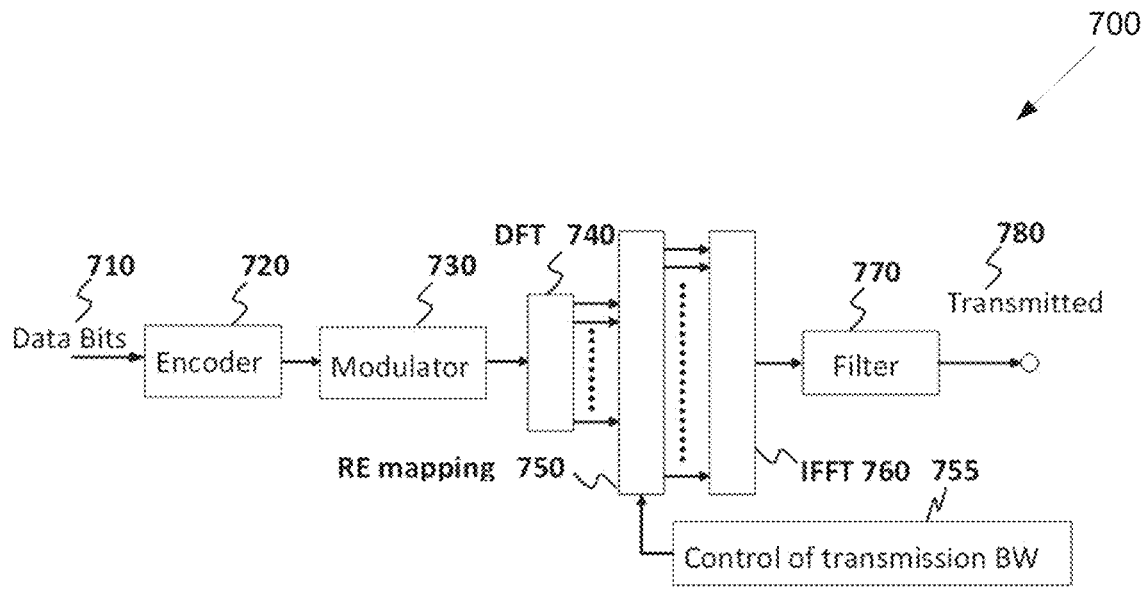
FIG. 7 illustrates an example of a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 4A can be implemented in specialized circuitry configured to perform the noted functions or one or more of the components can be implemented by one or more processors executing instructions to perform the noted functions. FIG. 7 does not limit the scope of this disclosure to any particular implementation of the diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
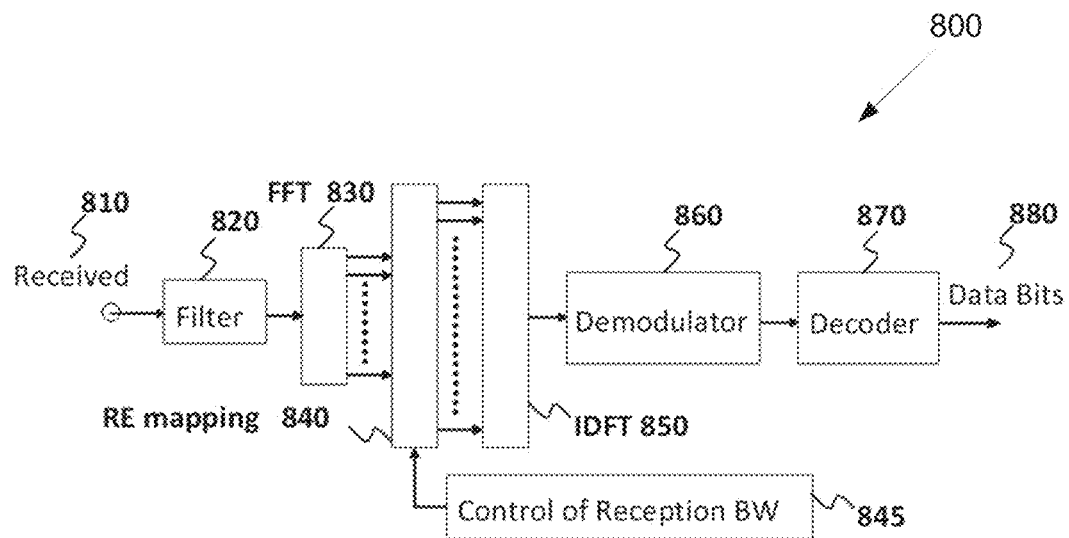
FIG. 8 illustrates an example of a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
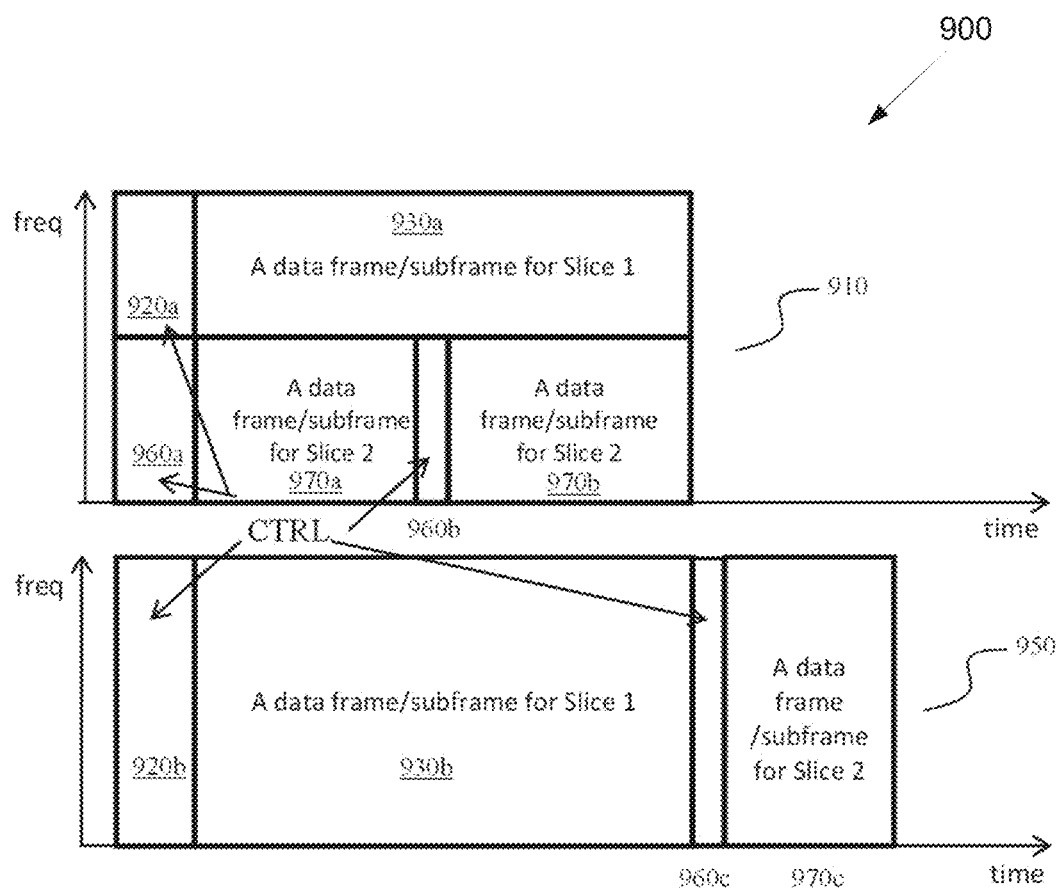
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

The 3GPP specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
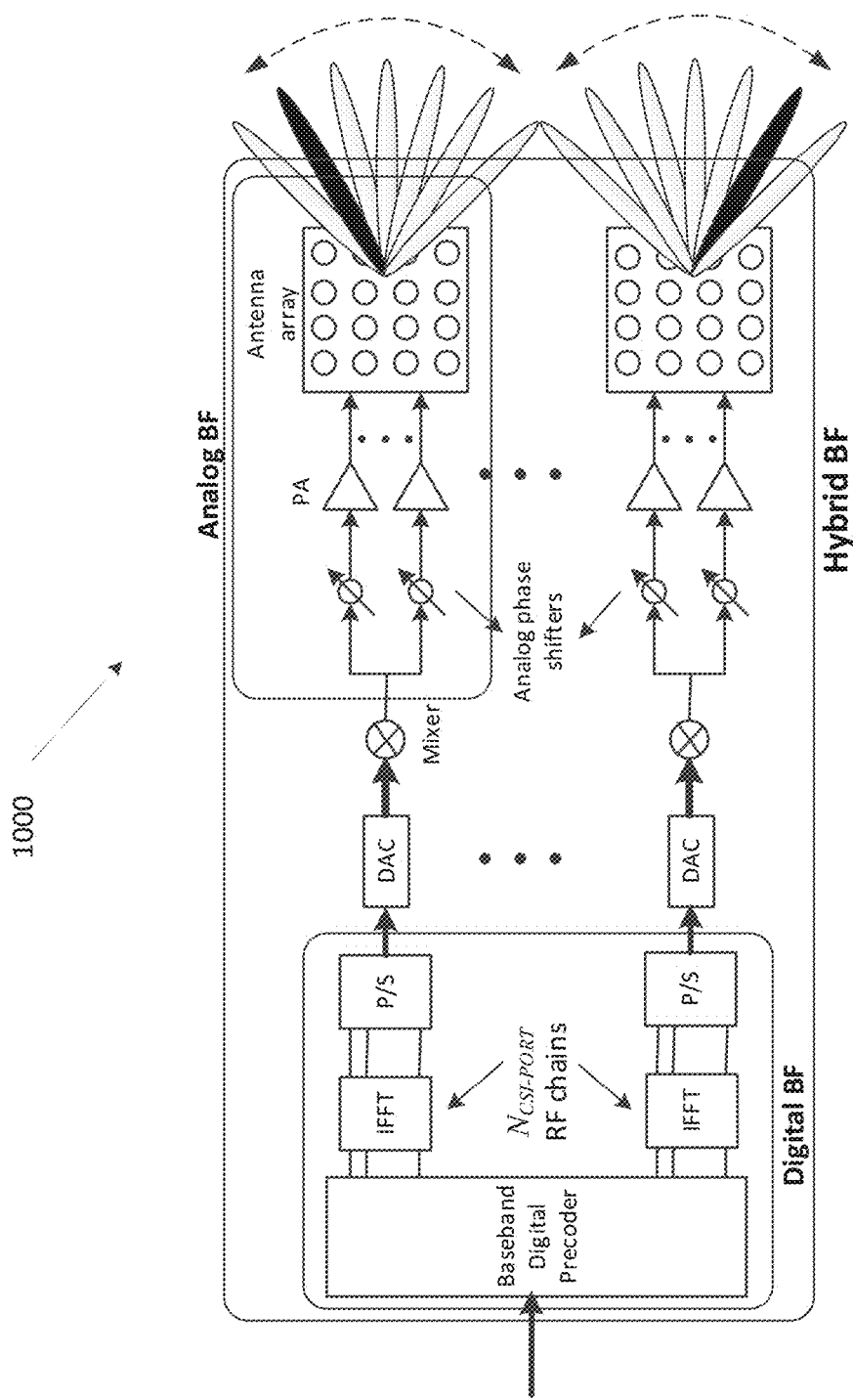
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. The analog beam can be configured to sweep across a wider range of angles by varying the phase shifter bank across symbols or subframes. A number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 11:
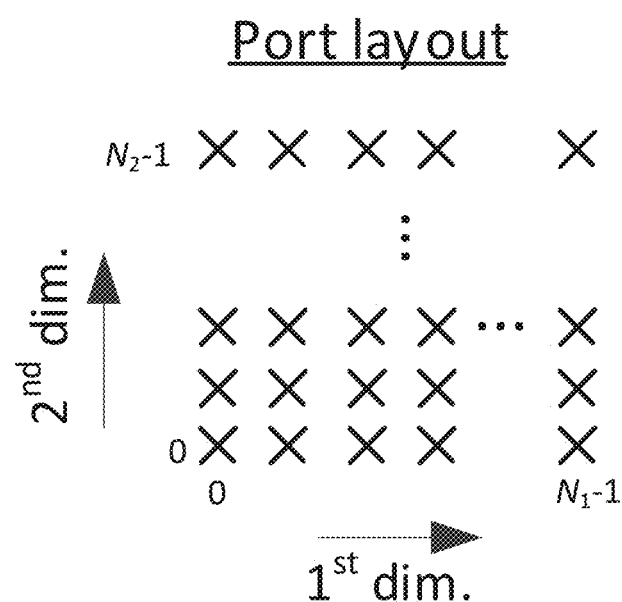
FIG. 11 illustrates an example antenna port layout according to embodiments of the present disclosure.

FIG. 11 illustrates an example antenna port layout 1100 according to embodiments of the present disclosure. The embodiment of the antenna port layout 1100 illustrated in FIG. 11 is for illustration only. FIG. 11 does not limit the scope of this disclosure to any particular implementation of the antenna port layout 1100.

As illustrated in FIG. 11, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. So, for a dual-polarized antenna port layout, the total number of antenna ports is $2N_1N_2$.

In the 3GPP NR specification, when the UE is configured with higher layer parameter codebookType set to 'typeII' or 'typeII-PortSelection', each PMI value corresponds to the codebook indices $i_1$ and $i_2$. When codebookType='typeII', the first PMI $i_1$ comprises two layer-common (i.e., reported common for two layers if the UE reports RI=2) components indicating:

an orthogonal basis set comprising $N_1N_2$ orthogonal discrete Fourier transform (DFT) beams/vectors (indicated using indicator $i_{1,1}$ indicating the rotation factors $(q_1, q_2)$); and L out of $N_1N_2$ beam/vector selection (indicated using indicator $i_{1,2}$), and two layer-specific (i.e., reported for each of the two layers if the UE reports RI=2) components indicating:

a strongest coefficient (indicated using indicators $i_{1,3,1}$ and $i_{1,3,2}$); and a WB amplitude coefficient $p_{l,i}^{(1)}$ (indicated using indicators $i_{1,4,1}$ and $i_{1,4,2}$).

When codebookType='typeII-PortSelection', the first PMI $i_1$ comprises a layer-common (i.e., reported common for two layers if UE reports RI=2) component indicating L out of $P_{CSI-RS}/2$ port selection (indicated using indicator $i_{1,1}$).

The values of $N_1$ and $N_2$ are configured with the higher layer parameter n1-n2-codebookSubsetRestriction. The supported configurations of $(N_1, N_2)$ for a given number of CSI-RS ports and the corresponding values of $(O_1, O_2)$ are given. The number of CSI-RS ports is $2N_1N_2$. The number of CSI-RS ports is given by $P_{CSI-RS} \in \{4, 8, 12, 16, 24, 32\}$ as configured by higher layer parameter nrofPorts. The value of L is configured with the higher layer parameter numberOfBeams.

The first PMI $i_1$ is given by $$i_1 = \begin{cases} [i_{1,1} \ i_{1,2} \ i_{1,3,1} \ i_{1,4,1}] & v=1 \\ [i_{1,1} \ i_{1,2} \ i_{1,3,1} \ i_{1,4,1} \ i_{1,3,2} \ i_{1,4,2}] & v=2 \end{cases}$$

if *codebookType* set to '*typeII*'

$$i_1 = \begin{cases} [i_{1,1} \ i_{1,3,1} \ i_{1,4,1}] & v=1 \\ [i_{1,1} \ i_{1,3,1} \ i_{1,4,1} \ i_{1,3,2} \ i_{1,4,2}] & v=2 \end{cases}$$

if *codebookType* set to '*typeII–PortSelection*'.

The second PMI $$i_2 = \begin{cases} [i_{2,1,1}] & subbandAmplitude = \text{'false'}, v=1 \\ [i_{2,1,1} \ i_{2,1,2}] & subbandAmplitude = \text{'false'}, v=2 \\ [i_{2,1,1} \ i_{2,2,1}] & subbandAmplitude = \text{'true'}, v=1 \\ [i_{2,1,1} \ i_{2,2,1} \ i_{2,1,2} \ i_{2,2,2}] & subbandAmplitude = \text{'true'}, v=2 \end{cases}$$

comprises two layer-specific components indicating:
- SB phase coefficient $c_{l,i}$ indicated using indicators $i_{2,1,1}$ and $i_{2,1,2}$, and
- SB amplitude coefficient $p_{l,i}^{(2)}$ (which can be turned ON or OFF by RRC signaling via subbandAmplitude) indicated using indicators $i_{2,2,1}$ and $i_{2,2,2}$.

The first PMI is reported in a wideband (WB) manner and the second PMI can be reported in a wideband or subband (SB) manner.

Figure 12:
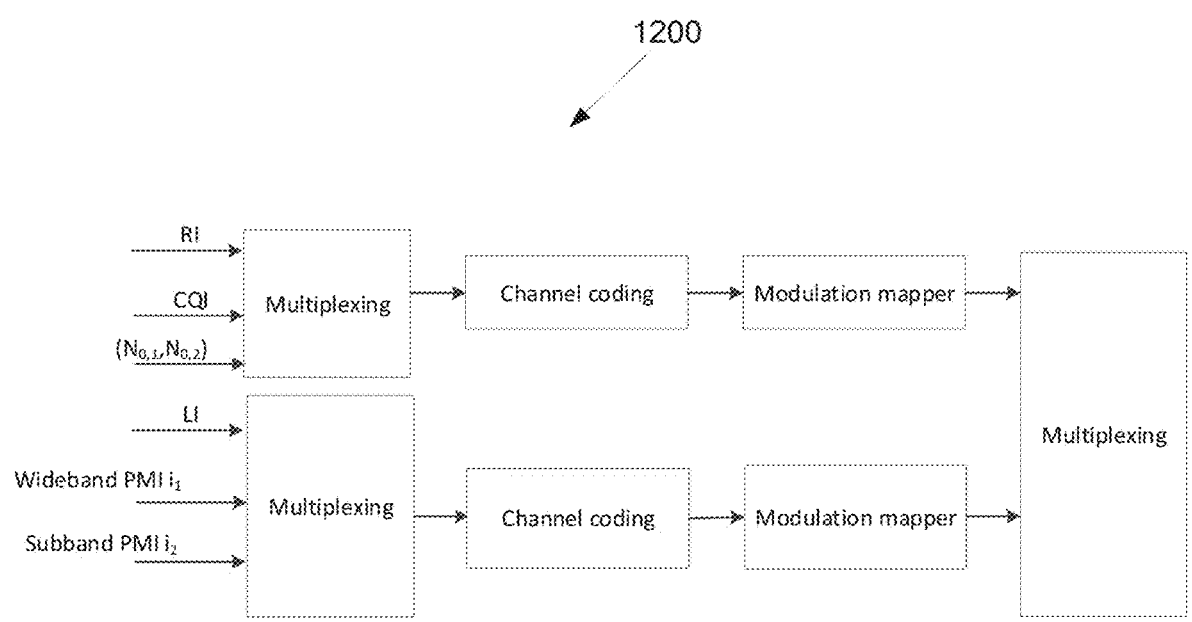
FIG. 12 illustrates an example of a two-part UCI multiplexing process, as may be performed by a UE, according to embodiments of the present disclosure.

FIG. 12 illustrates an example two-part UCI multiplexing process 1200 according to embodiments of the present disclosure, as may be performed by a UE such as UE 116. The embodiment of the two-part UCI multiplexing process 1200 illustrated in FIG. 12 is for illustration only. FIG. 12 does not limit the scope of this disclosure to any particular implementation of the process 1200.

As shown in FIG. 12, the two-part UCI multiplexing 1200 is used to report Type II CSI on PUSCH (or PUCCH) when codebookType='typeII' or 'typeII-PortSelection', wherein
- CQI, RI, and ($N_{0,1}$, $N_{0,2}$) are multiplexed and encoded together in part 1, where $N_{0,1}$ and $N_{0,2}$ respectively indicate the number of reported WB amplitudes that are non-zero for layer 1 and layer 2 respectively, i.e., $p_{l,i}^{(1)} \neq 0$; and
- Remaining CSI are multiplexed and encoded together in part 2, where the remaining CSI includes the first PMI $i_1$ and the second PMI ($i_2$). It may also include layer indicator (LI).

The part 1 UCI may also include CRI if the UE is configured with more than one CSI-RS resource. When cqi-FormatIndicator=widebandCQI, then CQI reported in part 1 UCI corresponds to WB CQI, and when cqi-FormatIndicator=subbandCQI, then CQI reported in part 1 UCI corresponds to WB CQI and SB differential CQI, where WB CQI is reported common for all SBs, and SB differential CQI is reported for each SB, and the number of SBs (or the set of SB indices) is configured to the UE.

Based on the value of the reported ($N_{0,1}$, $N_{0,2}$) in part 1, the CSI reporting payload (bits) for part 2 is determined. In particular, the components of the second PMI $i_2$ are reported only for the coefficients whose corresponding reported WB amplitudes are non-zero.

As described in U.S. Pat. No. 10,659,118 issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination based Type II CSI reporting framework is extended to include a frequency dimension in addition to the first and second antenna port dimensions.

Figure 13:
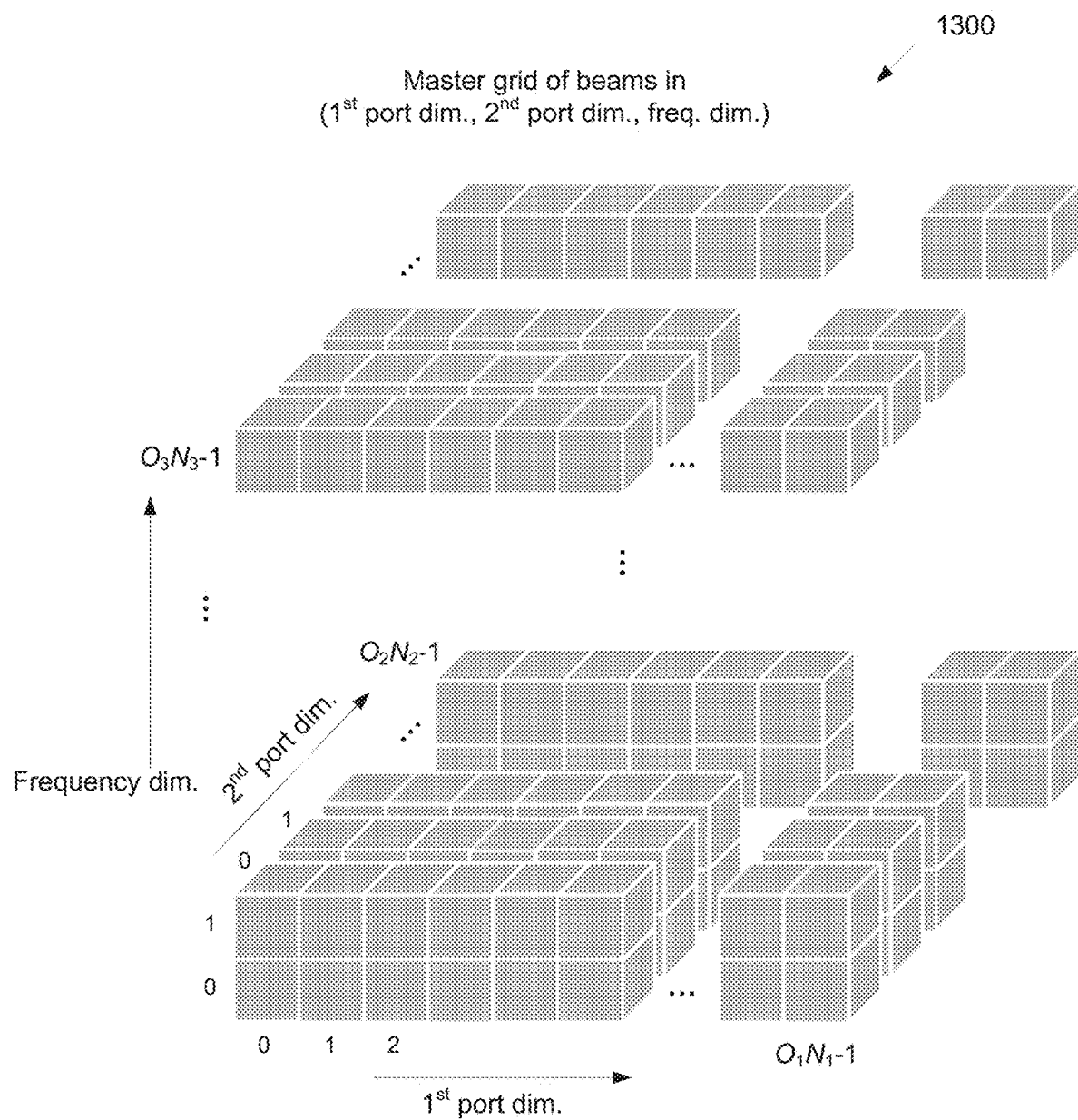
FIG. 13 illustrates an example of a 3D grid of oversampled DFT beams according to embodiments of the present disclosure.

FIG. 13 illustrates an example 3D grid 1300 of the oversampled DFT beams (1st port dim., 2nd port dim., freq. dim.) according to embodiments of the present disclosure. The embodiment of the 3D grid 1300 illustrated in FIG. 13 is for illustration only. FIG. 13 does not limit the scope of this disclosure to any particular implementation of the grid 1300.

As shown, FIG. 13 illustrates the 3D grid 1300 of the oversampled DFT beams (1st port dim., 2nd port dim., freq. dim.) in which
- 1st dimension is associated with the 1st port dimension,
- 2nd dimension is associated with the 2nd port dimension, and
- 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_i$ belongs to {2, 4, 8}. In yet another example, at least one of $O_1$, $O_2$, and $O_3$ is higher layer configured (via RRC signaling).

A UE is configured with higher layer parameter CodebookType set to 'TypeII-Compression' or 'TypeIII' for an enhanced Type II CSI reporting in which the pre-coders for all SBs and for a given layer l=1, ..., ν, where ν is the associated RI value, is given by either $$W^l = AC_l B^H = [a_0 \; a_1 \; ... \; a_{L-1}] \begin{bmatrix} c_{l,0,0} & c_{l,0,1} & \cdots & c_{l,0,M-1} \\ c_{l,1,0} & c_{l,1,1} & \cdots & c_{l,0,M-1} \\ \vdots & \vdots & \vdots & \vdots \\ c_{l,L-1,0} & c_{l,L-1,1} & \cdots & c_{l,L-1,M-1} \end{bmatrix} = \quad \text{(Eq. 1)}$$

$$[b_0 b_1 \; ... \; b_{M-1}]^H =$$

$$\sum_{m=0}^{M-1} \sum_{k=0}^{L-1} c_{l,i,m}(a_i b_M^H) = \sum_{k=0}^{L-1} \sum_{m=0}^{M-1} c_{l,i,m}(a_i b_M^H), \text{ or}$$

(Eq. 2)

$$W^l = \begin{bmatrix} A & 0 \\ 0 & A \end{bmatrix} C_l$$

$$B^H = \begin{bmatrix} a_0 a_1 ... a_{L-1} & 0 \\ 0 & a_0 a_1 ... a_{L-1} \end{bmatrix} \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix}$$

$$[b_0 b_1 \; ... \; b_{M-1}]^H = \begin{bmatrix} \sum_{m=0}^{M-1} \sum_{k=0}^{L-1} c_{l,i,m}(a_i b_m^H) \\ \sum_{m=0}^{M-1} \sum_{k=0}^{L-1} c_{l,i,m}(a_i b_m^H) \end{bmatrix},$$

where
- $N_1$ is a number of antenna ports in a first antenna port dimension,
- $N_2$ is a number of antenna ports in a second antenna port dimension,
- $N_3$ is a number of SBs or frequency domain (FD) units/components for PMI reporting (that comprise the CSI reporting band), which can be different (e.g., less than) from a number of SBs for CQI reporting.
- $a_i$ is a $2N_1N_2 \times 1$ (Eq. 1) or $N_1N_2 \times 1$ (Eq. 2) column vector,
- $b_m$ is a $N_3 \times 1$ column vector,
- $c_{l,i,m}$ is a complex coefficient.

In a variation, when the UE reports a subset K<2LM coefficients (where K is either fixed, configured by the gNB or reported by the UE), then the coefficient in precoder equations Eq. 1 or Eq. 2 is replaced with $x_{l,i,m} \times c_{l,i,m}$, where:
- $x_{l,i,m}=1$ if the coefficient $c_{l,i,m}$ is reported by the UE according to some embodiments of this disclosure.
- $x_{l,i,m}=0$ otherwise (i.e., $c_{l,i,m}$ is not reported by the UE). The indication whether $x_{l,i,m}=1$ or 0 is according to some embodiments of this disclosure.

In a variation, the precoder equations Eq. 1 or Eq. 2 are respectively generalized to $$W^l = \sum_{k=0}^{L-1} \sum_{m=0}^{M_i-1} c_{l,i,m}(a_i b_{i,m}^H) \quad \text{(Eq. 3)}$$

-continued and $$W^l = \begin{bmatrix} \sum_{i=0}^{L-1} \sum_{m=0}^{M_i-1} c_{l,i,m}(a_i b_{i,m}^H) \\ \sum_{i=0}^{L-1} \sum_{m=0}^{M_i-1} c_{l,i+L,m}(a_i b_{i,m}^H) \end{bmatrix}, \quad \text{(Eq. 4)}$$

where for a given i, the number of basis vectors is $M_i$ and the corresponding basis vectors are $\{b_{i,m}\}$. Note that $M_i$ is the number of coefficients $c_{l,i,m}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers (v=R), the pre-coding matrix is given by $$W^{(R)} = \frac{1}{\sqrt{R}}[W^1 \ W^2 \ \cdots \ W^R].$$

Eq. 2 is assumed in the rest of the disclosure. The embodiments of the disclosure, however, are general and are also applicable to Eq. 1, Eq. 3 and Eq. 4.

Here $L \leq 2N_1N_2$ and $K \leq N_3$. If $L=2N_1N_2$, then A is an identity matrix, and hence not reported. Likewise, if $K=N_3$, then B is an identity matrix, and hence not reported. Assuming $L<2N_1N_2$, in an example, to report columns of A, the oversampled DFT codebook is used. For instance, $a_i=v_{l,m}$, where the quantity $v_{l,m}$ is given by:

$$u_m = \begin{cases} \left[1 \ e^{j\frac{2\pi m}{O_2 N_2}} \ \ldots \ e^{j\frac{2\pi m(N_2-1)}{O_2 N_2}}\right] & N_2 > 1 \\ 1 & N_2 = 1 \end{cases}$$

$$v_{l,m} = \left[u_m \ e^{j\frac{2\pi l}{O_1 N_1}} u_m \ \ldots \ e^{j\frac{2\pi l(N_1-1)}{O_1 N_1}} u_m\right]^T.$$

Similarly, assuming $K<N_3$, in an example, to report columns of B, the oversampled DFT codebook is used. For instance, $b_m=w_m$, where the quantity $w_m$ is given by:

$$w_m = \left[1 \ e^{j\frac{2\pi m}{O_3 N_3}} \ \ldots \ e^{j\frac{2\pi m(N_3-1)}{O_3 N_3}}\right].$$

In another example, discrete cosine transform (DCT) basis is used to construct/report basis B for the $3^{rd}$ dimension. The m-th column of the DCT compression matrix is simply given by:

$$[W_f]_{nm} = \begin{cases} \frac{1}{\sqrt{K}}, & n = 0 \\ \sqrt{\frac{2}{K}} \cos\frac{\pi(2m+1)n}{2K}, & n = 1, \ldots K-1 \end{cases},$$

and $K = N_3$, and $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W = A_l C_l B_l^H = W_1 \tilde{W}_2 W_f^H, \quad (5)$$

where $A=W_1$ corresponds to the Rel. 15 $W_1$ in Type II CSI codebook [REF8], and $B=W_f$. The $C=\tilde{W}_2$ matrix consists of all the required linear combination coefficients (e.g., amplitude and phase or real or imaginary). Each reported coefficient ($c_{l,i,m}=p_{l,i,m}\phi_{l,i,m}$) in $\tilde{W}_2$ is quantized as amplitude coefficient ($p_{l,i,m}$) and phase coefficient ($\phi_{l,i,m}$) In one example, the amplitude coefficient ($p_{l,i,m}$) is reported using a A-bit amplitude codebook where A belongs to $\{2, 3, 4\}$. If multiple values for A are supported, then one value is configured via higher layer signaling. In another example, the amplitude coefficient ($p_{l,i,m}$) is reported as $p_{l,i,m}=p_{l,i,m}^{(1)} p_{l,i,m}^{(2)}$ where:
  $p_{l,i,m}^{(1)}$ is a reference or first amplitude which is reported using a A1-bit amplitude codebook where A1 belongs to $\{2, 3, 4\}$, and
  $p_{l,i,m}^{(2)}$ is a differential or second amplitude which is reported using a A2-bit amplitude codebook where $A2 \leq A1$ belongs to $\{2, 3, 4\}$.

For layer l, let us denote the linear combination (LC) coefficient associated with spatial domain (SD) basis vector (or beam) $i \in \{0,1, \ldots, 2L-1\}$ and frequency domain (FD) basis vector (or beam) $m \in \{0,1, \ldots, M-1\}$ as $c_{l,i,m}$, and the strongest coefficient $c_{l,i^*,m^*}$. The strongest coefficient is reported out of the $K_{NZ}$ non-zero (NZ) coefficients that is reported using a bitmap, where $K_{NZ} \leq K_0 = \lceil \beta \times 2LM \rceil < 2LM$ and $\beta$ is higher layer configured. The remaining $2LM-K_{NZ}$ coefficients that are not reported by the UE are assumed to be zero. The following quantization scheme is used to quantize/report the $K_{NZ}$ NZ coefficients.

The UE reports the following for the quantization of the NZ coefficients in $\tilde{W}_2$:
  An X-bit indicator for the strongest coefficient index ($i^*$, $m^*$), where $X=\lceil \log_2 K_{NZ} \rceil$ or $\lceil \log_2 2L \rceil$.
  Strongest coefficient $c_{l,i^*,m^*}=1$ (hence its amplitude/phase are not reported).
  Two antenna polarization-specific reference amplitudes are used (first antenna polarization corresponds to $i=0,1, \ldots, L-1$ and second antenna polarization corresponds to $i=L, L+1, \ldots, 2L-1$):
    For the polarization associated with the strongest coefficient $c_{l,i^*,m^*}=1$, since the reference amplitude $p_{l,i,m}^{(1)}=1$, it is not reported.
    For the other polarization, reference amplitude $p_{l,i,m}^{(1)}$ is quantized to 4 bits
    1. The 4-bit amplitude alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}\right\}.$$

For $\{c_{l,i,m}, (i, m) \neq (i^*, m^*)\}$:
  For each polarization, differential amplitudes $p_{l,i,m}^{(2)}$ of the coefficients calculated relative to the associated polarization-specific reference amplitude and quantized to 3 bits
  1. The 3-bit amplitude alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

2. Note: The final quantized amplitude $p_{l,i,m}$ is given by $p_{l,i,m}^{(1)} \times p_{l,i,m}^{(2)}$ Each phase is quantized to either 8PSK ($N_{ph}=8$) or 16PSK ($N_{ph}=16$) (which is configurable).

A UE can be configured to report M FD basis vectors. In one example, $$M = \left\lceil p \times \frac{N_3}{R} \right\rceil,$$

where R is higher-layer configured from {1,2} and p is higher-layer configured from {¼, ½}. In one example, the p value is higher-layer configured for rank 1-2 CSI reporting. For rank>2 (e.g., rank 3-4), the p value (denoted by $v_0$) can be different. In one example, for rank 1-4, (p, $v_0$) is jointly configured from {(½, ¼), (¼, ¼), (¼, ⅛)}, i.e., $$M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3 = N_{SB} \times R$ where $N_{SB}$ is the number of SBs for CQI reporting.

A UE can be configured to report M FD basis vectors in one-step from $N_3$ basis vectors freely (independently) for each layer $l \in \{0,1, \ldots, v-1\}$ of a rank $v$ CSI reporting. Alternatively, a UE can be configured to report M FD basis vectors in two-step as follows.

In step 1, an intermediate set (InS) comprising $N'_3 < N_3$ basis vectors is selected/reported, wherein the InS is common for all layers.

In step 2, for each layer $l \in \{0,1, \ldots, v-1\}$ of a rank $v$ CSI reporting, M FD basis vectors are selected/reported freely (independently) from $N'_3$ basis vectors in the InS.

In one example, one-step method is used when $N_3 \leq 19$ and two-step method is used when $N_3 > 19$. In one example, $N'_3 = \lceil \alpha M \rceil$ where $\alpha > 1$ is either fixed (to 2 for example) or configurable.

The codebook parameters used in the DFT based frequency domain compression (eq. 5) are (L, p, $v_0$, β, α, $N_{ph}$). In one example, the set of values for these codebook parameters are as follows.

L: the set of values is {2,4} in general, except L ∈ {2,4,6} for rank 1-2, 32 CSI-RS antenna ports, and R=1.
p for rank 1-2, and (p, $v_0$) for rank 3-4: p ∈ {¼, ½} and (p, $v_0$) ∈ {(½, ¼), (¼, ¼), (¼, ⅛)}.
β ∈ {¼, ½, ¾}.
α ∈ {1.5, 2, 2.5, 3}.
$N_{ph}$ ∈ {8,16}.

In another example, the set of values for these codebook parameters are as follows: α=2, $N_{ph}$=16, and

| L | p = $y_0$ (RI = 1-2) | p = $v_0$ (RI = 3-4) | β | Restriction (if any) |
|---|---|---|---|---|
| 2 | 1/4 | 1/8 | 1/4 | |
| 2 | 1/4 | 1/8 | 1/2 | |
| 4 | 1/4 | 1/8 | 1/4 | |
| 4 | 1/4 | 1/8 | 1/2 | |
| 4 | 1/4 | 1/4 | 1/2 | |
| 6 | 1/4 | — | 1/2 | RI = 1-2, 32 ports |
| 4 | 1/4 | 1/4 | 3/4 | |
| 6 | 1/4 | — | 3/4 | RI = 1-2, 32 ports |

The above-mentioned framework (equation 5) represents the precoding-matrices for multiple ($N_3$) FD units using a linear combination (double sum) over 2L SD beams and M FD beams. This framework can also be used to represent the precoding-matrices in time domain (TD) by replacing the FD basis matrix $W_f$ with a TD basis matrix $W_t$, wherein the columns of $W_t$ comprises M TD beams that represent some form of delays or channel tap locations. Hence, a precoder $W^l$ can be described as follows.

$$W = A_l C_l B_l^H = W_1 \tilde{W}_2 W_t^H, \quad (5A)$$

In one example, the M TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The rest of disclosure is applicable to both space-frequency (equation 5) and space-time (equation 5A) frameworks.

In general, for layer $l=0,1, \ldots, v-1$, where $v$ is the rank value reported via RI, the pre-coder (cf. equation 5 and equation 5A) includes the codebook components summarized in Table 1.

TABLE 1

Codebook components

| Index | Components | Description |
|---|---|---|
| 0 | $L_l$ | number of SD beams |
| 1 | $M_l$ | number of FD/TD beams |
| 2 | $\{a_{l,i}\}_{i=0}^{L_l-1}$ | set of SD beams comprising columns of $A_l$ |
| 3 | $\{b_{l,m}\}_{m=0}^{M_l-1}$ | set of FD/TD beams comprising columns of $B_l$ |
| 4 | $\{a_{l,i,m}\}$ | bitmap indicating the indices of the non-zero (NZ) coefficients |
| 5 | $SCI_l$ | Strongest coefficient indicator for layer l |
| 6 | $\{p_{l,i,m}\}$ | amplitudes of NZ coefficients indicated via the bitmap |
| 7 | $\{\phi_{l,i,m}\}$ | phases of NZ coefficients indicated via the bitmap |

In one example, the number of SD beams is layer-common, i.e., $L_l = L$ for all l values. In one example, the set of SD basis is layer-common, i.e., $a_{l,i} = a_i$ for all l values. In one example, the number of FD/TD beams is layer-pair-common or layer-pair-independent, i.e., $M_0 = M_1 = M$ for layer pair (0, 1), $M_2 = M_3 = M'$ for layer pair (2, 3), and M and M' can have different values. In one example, the set of FD/TD basis is layer-independent, i.e., $\{b_{l,m}\}$ can be different for different l values. In one example, the bitmap is layer-independent, i.e., $\{\beta_{l,i,m}\}$ can be different for different l values. In one example, the SCI is layer-independent, i.e., $\{SCI_l\}$ can be different for different l values. In one example, the amplitudes and phases are layer-independent, i.e., $\{p_{l,i,m}\}$ and $\{\phi_{l,i,m}\}$ can be different for different l values.

In one example, when the SD basis $W_1$ is a port selection, then the candidate values for L or $L_l$ include 1, and the candidate values for the number of CSI-RS ports $N_{CSI-RS}$ include 2.

In embodiment A, for SD basis, the set of SD beams $\{a_{l,i}\}_{i=0}^{L_l-1}$ comprising columns of $A_l$ is according to at least one of the following alternatives. The SD basis is common for the two antenna polarizations, i.e., one SD basis is used for both antenna polarizations.

In one alternative Alt A-0, whether there is any selection in SD or not depends on the value of $L_l$. If $$L_l = \frac{P_{CSI-RS}}{2},$$

there is no need for any selection in SD (since all ports are selected), and when $$L_l < \frac{P_{CSI-RS}}{2},$$

the SD ports are selected (hence reported), where this selection is according to at least one of Alt A-1 through Alt A-5.

In one alternative Alt A-1, the SD basis is analogous to the $W_1$ component in Rel.15 Type II port selection codebook, wherein the $L_l$ antenna ports or column vectors of $A_l$ are selected by the index $$q_1 \in \left\{0, 1, \ldots, \left\lceil \frac{P_{CSI-RS}}{2d} \right\rceil - 1\right\}$$

(this requires $$\left\lceil \log_2 \left\lceil \frac{P_{CSI-RS}}{2d} \right\rceil \right\rceil$$

bits), where $$d \leq \min\left(\frac{P_{CSI-RS}}{2}, L_l\right).$$

In one example, $d \in \{1,2,3,4\}$. To select columns of $A_l$, the port selection vectors are used, For instance, $a_i=v_m$, where the quantity $v_m$ is a $P_{CSI-RS}/2$-element column vector containing a value of 1 in element m mod $P_{CSI-RS}/2$ and zeros elsewhere (where the first element is element 0). The port selection matrix is then given by:

$$W_1 = A_l = \begin{bmatrix} X & 0 \\ 0 & X \end{bmatrix} \text{ where } X = [v_{q_1 d}\ v_{q_1 d+1}\ \cdots\ v_{q_1 d+L_l-1}].$$

In one alternative Alt A-2, the SD basis selects $L_l$ antenna ports freely, i.e., the $L_l$ antenna ports per polarization or column vectors of $A_l$ are selected freely by the index $$q_1 \in \left\{0, 1, \ldots, \binom{\frac{P_{CSI-RS}}{2}}{L_l} - 1\right\}$$

(this requires $$\left\lceil \log_2 \binom{\frac{P_{CSI-RS}}{2}}{L_l} \right\rceil$$

bits). To select columns of $A_l$, the port selection vectors are used, For instance, $a_i=v_m$, where the quantity $v_m$ is a $P_{CSI-RS}/2$-element column vector containing a value of 1 in element (m mod $P_{CSI-RS}/2$) and zeros elsewhere (where the first element is element 0). Let $\{x_0, x_1, \ldots, x_{L_l-1}\}$ be indices of selection vectors selected by the index $q_1$. The port selection matrix is then given by:

$$W_1 = A_l = \begin{bmatrix} X & 0 \\ 0 & X \end{bmatrix} \text{ where } X = [v_{x_0}\ v_{x_1}\ \cdots\ v_{x_{L_l-1}}].$$

In one alternative Alt A-3, the SD basis selects $L_l$ DFT beams from an oversampled DFT codebook, i.e., $a_i=v_{i_1,i_2}$, where the quantity $v_{i_1,i_2}$ is given by:

$$u_{i_2} = \begin{cases} \begin{bmatrix} 1 & e^{j\frac{2\pi i_2}{O_2 N_2}} & \cdots & e^{j\frac{2\pi i_2 (N_2-1)}{O_2 N_2}} \end{bmatrix} & N_2 > 1 \\ 1 & N_2 = 1 \end{cases}.$$

$$v_{i_1,i_2} = \begin{bmatrix} u_{i_2} & e^{j\frac{2\pi i_1}{O_1 N_1}} u_{i_2} & \cdots & e^{j\frac{2\pi i_1 (N_1-1)}{O_1 N_1}} u_{i_2} \end{bmatrix}^T$$

In one example, this selection of $L_l$ DFT beams is from a set of orthogonal DFT beams comprising $N_1 N_2$ two-dimensional DFT beams.

In one alternative Alt A-4, the SD basis selects $L_l$ antenna ports freely from $P_{CSI-RS}$ ports, i.e., the $L_l$ antenna ports or column vectors of $A_l$ are selected freely by the index $$q_1 \in \left\{0, 1, \ldots, \binom{P_{CSI-RS}}{L_l} - 1\right\}$$

(this requires $$\left\lceil \log_2 \binom{P_{CSI-RS}}{L_l} \right\rceil$$

bits). To select columns of $A_l$, the port selection vectors are used, For instance, $a_i=v_m$, where the quantity $v_m$ is a $P_{CSI-RS}$-element column vector containing a value of 1 in element (m mod $P_{CSI-RS}$) and zeros elsewhere (where the first element is element 0). Let $\{x_0, x_1, \ldots, x_{L_l-1}\}$ be indices of selection vectors selected by the index $q_1$. The port selection matrix is then given by:

$$W_1 = A_l = \begin{bmatrix} X & 0 \\ 0 & X \end{bmatrix} \text{ where } X = [v_{x_0}\ v_{x_1}\ \cdots\ v_{x_{L_l-1}}].$$

In one alternative Alt A-5, the SD basis selects $2L_l$ antenna ports freely from $P_{CSI-RS}$ ports, i.e., the $2L_l$ antenna ports or column vectors of $A_l$ are selected freely by the index $$q_1 \in \left\{0, 1, \ldots, \binom{P_{CSI-RS}}{2L_l} - 1\right\}$$

(this requires $$\left\lceil \log_2 \binom{P_{CSI-RS}}{2L_l} \right\rceil$$

bits). To select columns of $A_l$, the port selection vectors are used, For instance, $a_l = v_m$, where the quantity $v_m$ is a $P_{CSI-RS}$-element column vector containing a value of 1 in element (m mod $P_{CSI-RS}$) and zeros elsewhere (where the first element is element 0). Let $\{x_0, x_1, \ldots, x_{2L_l-1}\}$ be indices of selection vectors selected by the index $q_1$. The port selection matrix is then given by:

$$W_1 = A_l = \begin{bmatrix} X & 0 \\ 0 & X \end{bmatrix} \text{ where } X = \begin{bmatrix} v_{x_0} & v_{x_1} & \cdots & v_{x_{2L_l-1}} \end{bmatrix}.$$

In embodiment AA, a variation of embodiment A, the SD basis is selected independently for each of the two antenna polarizations, according to at least one of Alt A-1 through Alt A-3.

In embodiment B, for FD/TD basis, the set of FD/TD beams $\{b_{l,m}\}_{m=0}^{M_l-1}$ comprising columns of $B_l$ is according to at least one of the following alternatives.

In one alternative Alt B-0, whether there is any selection in FD/TD or not depends on the value of $M_l$. If $M_l = N'_3$, there is no need for any selection in FD/TD (since all ports are selected), and when $M_l < N'_3$, the FD/TD ports are selected (hence reported), where this selection is according to at least one of Alt B-1 through Alt B-3.

In one alternative Alt B-1, the FD/TD basis selection to similar to Alt A-1, i.e., the $M_l$ FD/TD units ports or column vectors of $B_l$ are selected by the index $$q_2 \in \left\{0, 1, \ldots, \left\lceil \frac{N'_3}{e} \right\rceil - 1\right\}$$

(this requires $$\left\lceil \log_2 \left\lceil \frac{N'_3}{e} \right\rceil \right\rceil$$

bits), where $e \leq \min(N'_3, M_l)$. In one example, $e \in \{1,2,3,4\}$. To select columns of $B_l$, the selection vectors are used, For instance, $b_m = v_z$, where the quantity $v_z$ is a $N'_3$-element column vector containing a value of 1 in element (z mod $N'_3$) and zeros elsewhere (where the first element is element 0). The selection matrix is then given by:

$$W_f = B_l = [v_{q_2 e} v_{q_2 e+1} \cdots v_{q_2 e + M_l - 1}].$$

In one alternative Alt B-2, the FD/TD basis selects $M_l$ FD/TD units freely, i.e., the $M_l$ FD/TD units or column vectors of $B_l$ are selected freely by the index $$q_2 \in \left\{0, 1, \ldots, \binom{N'_3}{M_l} - 1\right\}$$

(this requires $$\left\lceil \log_2 \binom{N'_3}{M_l} \right\rceil$$

bits). To select columns of $B_l$, the selection vectors are used, For instance, $b_m = v_z$, where the quantity $v_z$ is a $N'_3$-element column vector containing a value of 1 in element (z mod $N'_3$) and zeros elsewhere (where the first element is element 0). Let $\{x_0, x_1, \ldots, x_{M_l-1}\}$ be indices of selection vectors selected by the index $q_2$. The selection matrix is then given by:

$$W_f = B_l = \begin{bmatrix} v_{x_0} & v_{x_1} & \cdots & v_{x_{M_l-1}} \end{bmatrix}.$$

In one alternative Alt B-3, the FD/TD basis selects $M_l$ DFT beams from an oversampled DFT codebook, i.e., $b_m = w_m$, where the quantity $w_m$ is given by:

$$w_m = \begin{bmatrix} 1 & e^{j\frac{2\pi m}{o_3 N'_3}} & \cdots & e^{j\frac{2\pi m(N'_3-1)}{o_3 N'_3}} \end{bmatrix}.$$

In one example, this selection of $M_l$ DFT beams is from a set of orthogonal DFT beams comprising $N_3$ DFT beams. In one example, $O_3 = 1$.

In alternatives Alt B-1 through Alt B-3, the value of $N'_3$ is according to at least one of the following examples. In one example, $N'_3 = N_3$. In one example, $N'_3 < N_3$. In one example, $N'_3 = aM_v$ where a=2 for example. In one example, $N'_3$ is configured (e.g., via RRC).

In embodiment C, the SD and FD/TD bases are according to at least one of the alternatives in Table 2.

TABLE 2

| alternatives for SD and FD/TD bases | | |
|---|---|---|
| Alt | SD basis | FD/TD basis |
| C-0 | Alt A-1 | Alt B-0 |
| C-1 | | Alt B-1 |
| C-2 | | Alt B-2 |
| C-3 | | Alt B-3 |
| C-4 | Alt A-2 | Alt B-0 |
| C-5 | | Alt B-1 |
| C-6 | | Alt B-2 |
| C-7 | | Alt B-3 |
| C-8 | Alt A-3 | Alt B-0 |
| C-9 | | Alt B-1 |
| C-10 | | Alt B-2 |
| C-11 | | Alt B-3 |
| C-12 | Alt A-4 | Alt B-0 |
| C-13 | | Alt B-1 |
| C-14 | | Alt B-2 |
| C-15 | | Alt B-3 |
| C-16 | Alt A-5 | Alt B-0 |
| C-17 | | Alt B-1 |
| C-18 | | Alt B-2 |
| C-19 | | Alt B-3 |
| C-20 | Alt A-0 | Alt B-0 |
| C-21 | | Alt B-1 |
| C-22 | | Alt B-2 |
| C-23 | | Alt B-3 |

In embodiment D, a UE is configured with higher layer parameter codebookType set to 'typeII-PortSelection-r17' for CSI reporting based on a new (Rel. 17) Type II port selection codebook in which the port selection (which is in SD) in Rel. 15/16 Type II port selection codebook is extended to FD in addition to SD. The new port selection codebook facilitates independent (separate) port selection across SD and FD. This separate port selection corresponds to port selection in SD via $W_1$ and port selection in FD via $W_f$. The set of SD port selection vectors $\{a_{l,i}\}_{i=0}^{L_l-1}$ comprising columns of $A_l$ is according to at least one of Alt A-0 through Alt A-5. The set of FD port selection vectors $\{b_{l,m}\}_{m=0}^{M_l-1}$ comprising columns of $B_l$ is according to at least one of Alt B-0 through Alt B-3.

In one example D.1, for layer l=0,1, ..., v−1, where v is the rank value reported via RI, the pre-coder (cf. equation 5 and equation 5A) includes the codebook components (indicated via PMI) summarized in Table 3. The parameters $L_l$ and $M_l$ are either fixed or configured (e.g., via RRC).

In one example D.2, for layer l=0,1, ..., v−1, where v is the rank value reported via RI, the pre-coder (cf. equation 5 and equation 5A) includes the codebook components (indicated via PMI) summarized in Table 3 except that component index 4 for the reference amplitude is not included in the codebook.

In one example D.3, for layer l=0,1, ..., v−1, where v is the rank value reported via RI, the pre-coder (cf. equation 5 and equation 5A) includes the codebook components (indicated via PMI) summarized in Table 3 except that component index 2 for the bitmap is not included in the codebook.

In one example D.4, for layer l=0,1, ..., v−1, where v is the rank value reported via RI, the pre-coder (cf. equation 5 and equation 5A) includes the codebook components (indicated via PMI) summarized in Table 3 except that component indices 2 and 4 for the reference amplitude and the bitmap respectively are not included in the codebook.

TABLE 3

Codebook components

| Index | Components | Description |
|---|---|---|
| 0 | $\{a_{l,i}\}_{i=0}^{L_l-1}$ | set of selected SD beams/ports comprising columns of $A_l$ |
| 1 | $\{b_{l,m}\}_{m=0}^{M_l-1}$ | set of selected FD/TD beams/ports comprising columns of $B_l$ |
| 2 | $\{x_{l,i,m}\}$ | bitmap indicating the indices of the non-zero (NZ) coefficients |
| 3 | $SCI_l$ | an indicator indicating an index (i*, m*) of the strongest coefficient for layer l |
| 4 | $p_{l,r}^{(1)}$ | reference amplitude |
| 5 | $\{p_{l,i,m}\}$ | amplitudes of NZ coefficients indicated via the bitmap |
| 6 | $\{\phi_{l,i,m}\}$ | phases of NZ coefficients indicated via the bitmap |

In embodiment E, a UE is configured with higher layer parameter codebookType set to 'typeII-PortSelection-r17' for CSI reporting based on a new (Rel. 17) Type II port selection codebook in which the port selection (which is in SD) in Rel. 15/16 Type II port selection codebook is extended to FD in addition to SD. The new port selection codebook facilitates separate port selection in SD. This separate port selection corresponds to port selection only in SD via $W_1$ and no port selection in FD via $W_f$. The set of SD port selection vectors $\{a_{l,i}\}_{i=0}^{L_l-1}$ comprising columns of $A_l$ is according to at least one of the one of Alt A-0 through Alt A-5.

In one example E.1, for layer l=0,1, ..., v−1, where v is the rank value reported via RI, the pre-coder (cf. equation 5 and equation 5A) includes the codebook components (indicated via PMI) summarized in Table 4. The parameters $L_l$ and $M_l$ are either fixed or configured (e.g., via RRC).

TABLE 4

Codebook components

| Index | Components | Description |
|---|---|---|
| 0 | $\{a_{l,i}\}_{i=0}^{L_l-1}$ | set of selected SD beams/ports comprising columns of $A_l$ |
| 2 | $\{x_{l,i,m}\}$ | bitmap indicating the indices of the non-zero (NZ) coefficients |
| 3 | $SCI_l$ | an indicator indicating an index (i*, m*) of the strongest coefficient for layer l |
| 4 | $p_{l,r}^{(1)}$ | reference amplitude |
| 5 | $\{p_{l,i,m}\}$ | amplitudes of NZ coefficients indicated via the bitmap |
| 6 | $\{\phi_{l,i,m}\}$ | phases of NZ coefficients indicated via the bitmap |

In one example E.2, for layer l=0,1, ..., v−1, where v is the rank value reported via RI, the pre-coder (cf. equation 5 and equation 5A) includes the codebook components (indicated via PMI) summarized in Table 4 except that component index 4 for the reference amplitude is not included in the codebook.

In one example E.3, for layer l=0,1, ..., v−1, where v is the rank value reported via RI, the pre-coder (cf. equation 5 and equation 5A) includes the codebook components (indicated via PMI) summarized in Table 4 except that component index 2 for the bitmap is not included in the codebook.

In one example E.4, for layer l=0,1, ..., v−1, where v is the rank value reported via RI, the pre-coder (cf. equation 5 and equation 5A) includes the codebook components (indicated via PMI) summarized in Table 4 except that component indices 2 and 4 for the reference amplitude and the bitmap respectively are not included in the codebook.

In embodiment F, a UE is configured with higher layer parameter codebookType set to 'typeII-PortSelection-r17' for CSI reporting based on a new (Rel. 17) Type II port selection codebook in which the port selection (which is in SD) in Rel. 15/16 Type II port selection codebook is extended to FD in addition to SD. The new port selection codebook facilitates joint port selection across SD and FD. The codebook structure is similar to Rel. 15 NR Type II codebook comprising two main components.

$W_1$: to select $Y_v$ out of $P_{CSI-RS}$ SD-FD port pairs jointly.
  In one example, $Y_v \leq P_{CSI-RS}$ (if the port selection is independent across two polarizations or two groups of antennas with different polarizations).
  In one example, $$Y_v \leq \frac{P_{CSI-RS}}{2}$$

(if the port selection is common across two polarizations or two groups of antennas with different polarizations).
$W_2$: to select coefficients for the selected $Y_v$ SD-FD port pairs.

In one example, the joint port selection (and its reporting) is common across multiple layers (when v>1). In one example, the joint port selection (and its reporting) is independent across multiple layers (when v>1). The reporting of the selected coefficients is independent across multiple layers (when v>1). The corresponding precoding matrix (or matrices) is (are) given by:

$$W^l = W_1 W_2 = XC_l = \sum_{i=0}^{Y_v-1} c_{l,i} x_{l,i},$$

or $W^l = W_1 W_2 = \begin{bmatrix} X & 0 \\ 0 & X \end{bmatrix} C_l = \begin{bmatrix} \sum_{i=0}^{Y_v-1} c_{l,i} x_{l,i} \\ \sum_{i=0}^{Y_v-1} c_{l,i+L_v} x_{l,i} \end{bmatrix}$, where $X = [x_{l,0} \ x_{l,1} \ \ldots \ x_{l,Y_v-1}]$, $x_{l,i} = a_{l,i} b_{l,i}^H$ or $\text{vec}(a_{l,i} b_{l,i}^H)$ where $(a_{l,i}, b_{l,i})$ is the i-th SD-FD port pair. The notation vec(X) transforms matrix X into a column vector by concatenating columns of X.

$C_l$ comprises coefficients $\{c_{l,i}\}$ for the selected SD-FD port pairs $\{(a_{l,i}, b_{l,i})\}$.

In one example F.1, for layer l=0,1, ..., v−1, where v is the rank value reported via RI, the pre-coder (cf. equation 5 and equation 5A) includes the codebook components (indicated via PMI) summarized in Table 5. The parameter $Y_v$ is either fixed or configured (e.g., via RRC).

TABLE 5

Codebook components

| Index | Components | Description |
|---|---|---|
| 0 | $\{(a_{l,i}, b_{l,i})\}_{i=0}^{Y_v-1}$ | set of selected (SD, FD/TD) beam/port pairs comprising columns of $A_l$ and $B_l$ |
| 1 | $\{x_{l,i}\}$ | bitmap indicating the indices of the non-zero (NZ) coefficients |
| 2 | $SCI_l$ | an indicator indicating an index i* of the strongest coefficient for layer l |
| 3 | $p_{l,r}^{(1)}$ | reference amplitude |
| 4 | $\{p_{l,i}\}$ | amplitudes of NZ coefficients indicated via the bitmap |
| 5 | $\{\phi_{l,i}\}$ | phases of NZ coefficients indicated via the bitmap |

In one example F.2, for layer l=0,1, ..., v−1, where v is the rank value reported via RI, the pre-coder (cf. equation 5 and equation 5A) includes the codebook components (indicated via PMI) summarized in Table 5 except that component index 3 for the reference amplitude is not included in the codebook.

In one example F.3, for layer l=0,1, ..., v−1, where v is the rank value reported via RI, the pre-coder (cf. equation 5 and equation 5A) includes the codebook components (indicated via PMI) summarized in Table 5 except that component index 1 for the bitmap is not included in the codebook.

In one example F.4, for layer l=0,1, ..., v−1, where v is the rank value reported via RI, the pre-coder (cf. equation 5 and equation 5A) includes the codebook components (indicated via PMI) summarized in Table 5 except that component indices 1 and 3 for the reference amplitude and the bitmap respectively are not included in the codebook.

In embodiment 1, the codebook components in Table 1 can be divided into two subsets, a first subset (S1) and a second subset (S2), and a UE is configured with the first subset (S1) (either via higher layer RRC signaling or MAC CE based signaling or DCI based signaling). The UE uses the first subset (S1) of codebook components to derive the second subset (S2) of codebook components in Table 1, according to the above-mentioned framework (Eq. 5 or 5A). In one example, the first subset (S1) of codebook components is derived (e.g., by the gNB) based on the UL channel estimated using SRS transmission from the UE, and the derived first subset (S1) is configured to the UE. The first and second subsets may be disjoint, i.e., they do not have any common codebook components. Alternatively, they may have at least one common codebook component.

In one example, the first subset (S1) can be empty (i.e., has no codebook components). In one example, whether S1 is empty or non-empty (i.e., has at least one codebook component) is configured explicitly (e.g., via RRC signaling). In one example, S1 is empty or non-empty (i.e., has at least one codebook component) is determined implicitly, for example, based on the codebook components configured for CSI reporting.

Figure 14:
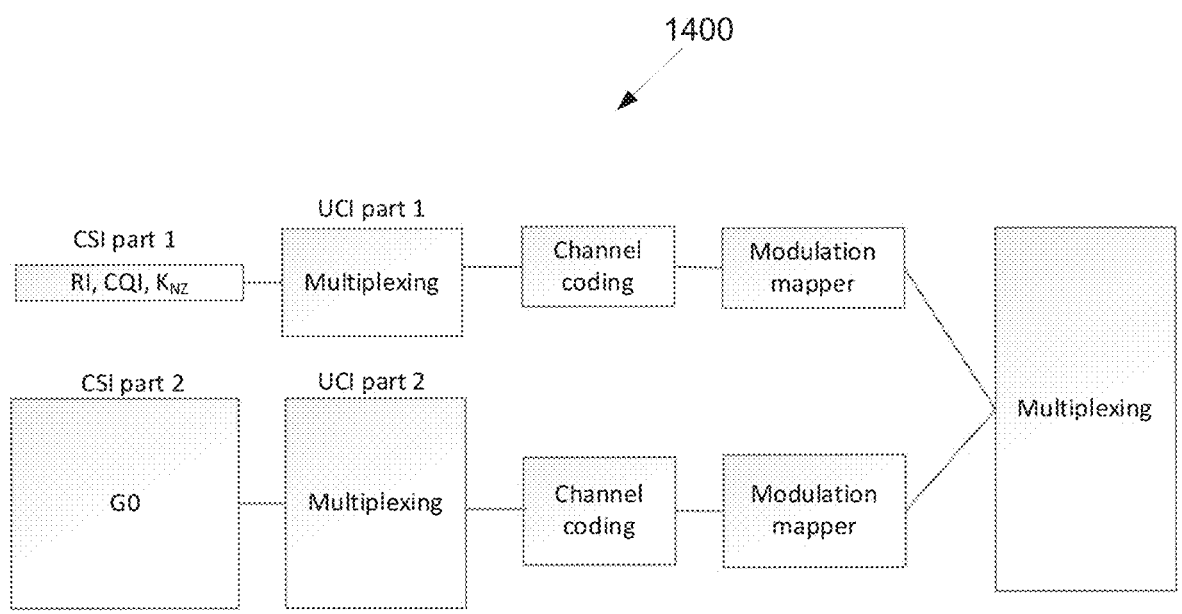
FIG. 14 illustrates an example of a two-part UCI multiplexing process, as may be performed by a UE, according to embodiments of the present disclosure.

FIG. 14 illustrates an example two-part UCI multiplexing process 1400 according to embodiments of the present disclosure, as may be performed by a UE such as UE 116. The embodiment of the two-part UCI multiplexing process 1400 illustrated in FIG. 14 is for illustration only. FIG. 14 does not limit the scope of this disclosure to any particular implementation of the process 1400.

As shown in FIG. 14, the UE is further configured to use a two-part UCI to multiplex and report a CSI report including only the second subset (S2) of codebook components, wherein CSI part 1 comprising CQI, RI, and $K_{NZ} = \sum_{l=0}^{v-1} K_{NZ,l}$ are multiplexed and encoded together in UCI part 1, where $K_{NZ}$ indicates the total number of NZ coefficients across v layers, and $K_{NZ,l}$ indicates a number of non-zero (NZ) coefficients for layer l; and CSI part 2 comprising the PMI indicating the second subset (S2) of codebook components is multiplexed and encoded together in UCI part 2.

The CSI part 2 comprises a single segment or group (G0). In a variation, $K_{NZ}$ in UCI part 1 indicate $K_{NZ,l}$ for each layer l=0,1, ..., v−1.

When the UL resource allocation (RA) for UCI part 2 reporting is sufficient (i.e., the number of bits allocated for UCI part 2 transmission is equal to or greater than the number of bits required for UCI part 2 transmission), then full CSI part 2 (i.e., G0) is transmitted. When the UL RA is no sufficient (i.e., the number of bits allocated for UCI part 2 transmission is less than the number of bits required for UCI part 2 transmission), then entire CSI part 2 (i.e., G0) can be omitted (not transmitted).

In one example, the amplitude and phase indices associated with the strongest coefficient(s) indicated via SCI(s) are also included in G0. In another example, the amplitude and phase indices associated with the strongest coefficient(s) are excluded from (not included in) G0.

In one example, a layer indicator (LI) indicating the strongest layer is included in UCI part 2. In another example, a layer indicator (LI) indicating the strongest layer is not included in UCI part 2. In another example, LI is included in UCI part 1 (not in UCI part 2).

The part 1 UCI may also include CRI if the UE is configured with more than one CSI-RS resources. When cqi-FormatIndicator=widebandCQI, then CQI reported in part 1 UCI corresponds to WB CQI, and when cqi-FormatIndicator=subbandCQI, then CQI reported in part 1 UCI corresponds to WB CQI and SB differential CQI, where WB CQI is reported common for all SBs, and SB differential CQI is reported for each SB, and the number of SBs (or the set of SB indices) is configured to the UE.

In one example, the maximum value of RI is 4. In another example, the maximum value of RI can be more than 4. In this later example, the CQI in UCI part 1 corresponds to up to 4 layers mapped into a first codeword (CW1) or transport block (TB1), and if RI>4, then a second CQI is reported in UCI part 2, which corresponds to additional RI-4 layers mapped into a second codeword (CW2) or transport block (TB2). In one example, the second CQI is included in CSI part 2 wideband. In another example, the second CQI is included in CSI part 2 subband. In one example, the second CQI is included in CSI part 2 wideband. In another example, when cqi-FormatIndicator=subbandCQI, then the second CQI comprises a WB second CQI included in CSI part 2 wideband and SB differential second CQI included in CSI part 2 subband.

Based on the value of the reported $K_{NZ}$ in UCI part 1, the CSI reporting payload (bits) for UCI part 2 is determined. In particular, the codebook components (e.g., amplitude and phase) are reported only for the coefficients that are non-zero.

In one alternative, the second subset (S2) includes all of the remaining codebook components (that are not configured via the first subset S1). A few examples of the first and second subsets are shown in Table 6. A few examples of the first and second subsets are shown in Table 7 through Table 10 for codebooks according to example D.1 through D.4, respectively. A few examples of the first and second subsets are shown in Table 11 through Table 14 for codebooks according to example E.1 through E.4, respectively. A few examples of the first and second subsets are shown in Table 14 through Table 18 for codebooks according to example F.1 through F.4, respectively.

TABLE 6

| | Codebook components from Table 1 | |
|---|---|---|
| Example | First subset (S1) | Second subset (S2) |
| 1-0 | {0, 1} | 2-7 |
| 1-1 | 0-4 | 5-7 |
| 1-2 | {0, 2, 4} | {1, 3, 5-7} |
| 1-3 | {1, 3, 4} | {0, 2, 5-7} |
| 1-4 | 0-3 | 4-7 |
| 1-5 | 2-4 | {0, 1, 5-7} |
| 1-6 | {0, 2} | {1, 3-7} |
| 1-7 | {1, 3} | {0, 2, 4-7} |
| 1-8 | {2, 3} | {0, 1, 4-7} |
| 1-9 | {3, 4} | {0-2, 5-7} |
| 1-10 | 3 | {0-2, 4-7} |

TABLE 7

| | Codebook components from Table 3 | |
|---|---|---|
| Example | First subset (S1) | Second subset (S2) |
| 1-0 | | {0, 1, . . . , 6} |
| 1-1 | {0} | {1, . . . , 6} |
| 1-2 | {1} | {0, 2, 3, . . . , 6} |
| 1-3 | {1, 2} | {0, 3, 4, 5, 6} |
| 1-4 | {0, 2} | {1, 3, 4, 5, 6} |
| 1-5 | {0, 1, 2} | {3, 4, 5, 6} |

TABLE 8

| | Codebook components from Table 3 | |
|---|---|---|
| Example | First subset (S1) | Second subset (S2) |
| 1-0 | | {0, 1, 2, 3, 5, 6} |
| 1-1 | {0} | {1, 2, 3, 5, 6} |
| 1-2 | {1} | {0, 2, 3, 5, 6} |
| 1-3 | {1, 2} | {0, 3, 5, 6} |
| 1-4 | {0, 2} | {1, 3, 5, 6} |
| 1-5 | {0, 1, 2} | {3, 5, 6} |

TABLE 9

| | Codebook components from Table 3 | |
|---|---|---|
| Example | First subset (S1) | Second subset (S2) |
| 1-0 | | {0, 1, 3, . . . , 6} |
| 1-1 | {0} | {1, 3, . . . , 6} |
| 1-2 | {1} | {0, 3, . . . , 6} |
| 1-3 | {0, 1} | {3, 4, 5, 6} |

TABLE 10

| | Codebook components from Table 3 | |
|---|---|---|
| Example | First subset (S1) | Second subset (S2) |
| 1-0 | | {0, 1, 3, 5, 6} |
| 1-1 | {0} | {1, 3, 5, 6} |
| 1-2 | {1} | {0, 3, 5, 6} |
| 1-3 | {0, 1} | {3, 5, 6} |

TABLE 11

| | Codebook components from Table 4 | |
|---|---|---|
| Example | First subset (S1) | Second subset (S2) |
| 1-0 | | {0, 2, . . . , 6} |
| 1-1 | {0} | {2, . . . , 6} |
| 1-2 | {2} | {0, 3, 4, 5, 6} |
| 1-3 | {0, 2} | {3, 4, 5, 6} |

TABLE 12

| | Codebook components from Table 4 | |
|---|---|---|
| Example | First subset (S1) | Second subset (S2) |
| 1-0 | | {0, 2, 3, 5, 6} |
| 1-1 | {0} | {2, 3, 5, 6} |
| 1-2 | {2} | {0, 3, 5, 6} |
| 1-3 | {0, 2} | {3, 5, 6} |

TABLE 13

| | Codebook components from Table 4 | |
|---|---|---|
| Example | First subset (S1) | Second subset (S2) |
| 1-0 | | {0, 3, 4, 5, 6} |
| 1-1 | {0} | {3, 4, 5, 6} |

TABLE 14

| | Codebook components from Table 4 | |
|---|---|---|
| Example | First subset (S1) | Second subset (S2) |
| 1-0 | | {0, 3, 5, 6} |
| 1-1 | {0} | {3, 5, 6} |

TABLE 15

| | Codebook components from Table 5 | |
|---|---|---|
| Example | First subset (S1) | Second subset (S2) |
| 1-0 | | {0, 1, . . . , 5} |
| 1-1 | {0} | {1, . . . , 5} |
| 1-2 | {1} | {0, 2, 3, 4, 5} |
| 1-3 | {0, 1} | {2, 3, 4, 5} |

TABLE 16

| | Codebook components from Table 5 | |
|---|---|---|
| Example | First subset (S1) | Second subset (S2) |
| 1-0 | | {0, 1, 2, 4, 5} |
| 1-1 | {0} | {1, 2, 4, 5} |
| 1-2 | {1} | {0, 2, 4, 5} |
| 1-3 | {0, 1} | {2, 4, 5} |

TABLE 17

| | Codebook components from Table 5 | |
|---|---|---|
| Example | First subset (S1) | Second subset (S2) |
| 1-0 | | {0, 2, 3, 4, 5} |
| 1-1 | {0} | {2, 3, 4, 5} |

TABLE 18

| | Codebook components from Table 5 | |
|---|---|---|
| Example | First subset (S1) | Second subset (S2) |
| 1-0 | | {0, 2, 4, 5} |
| 1-1 | {0} | {2, 4, 5} |

In embodiment 1A, a variation of embodiment 1, the first subset (S1) of the codebook components is fixed (hence, neither configured to the UE nor reported by the UE). In this variation, the codebook components in set S1 can be obtained by the gNB (NW) based on the UL channel estimated using SRS transmission from the UE. Likewise, the codebook components in set S1 can be obtained by the UE based on the DL channel estimated using CSI-RS transmission from the gNB. If the codebook components in set S1 are reciprocal between DL and UL channel estimates, then these components need not be reported by the UE (to the gNB) or configured to the UE (by the gNB) since they can be obtained using SRS or CSI-RS transmissions. The rest of the details of this embodiment (including the two-part UCI design) are the same as embodiment 1.

In embodiment 1B, a variation of embodiment 1, when the first subset (S1) includes SD basis but not FD/TD basis, then it also includes power level for each of SD beams included in this SD basis. Likewise, when the subset S1 includes FD/TD basis but not SD basis, then it also includes power level for each of FD/TD beams included in this FD/TD basis. When the subset S1 includes both SD basis and FD/TD basis, then it either includes separate power levels for SD and FD bases, i.e., SD power level for each of SD beams included in this SD basis and FD/TD power level for each of FD/TD beams included in this FD/TD basis, or includes a joint power level for all combinations of SD and FD/TD beam combinations. Note that in case of separate power level, the total number of power levels is $2L_l+M_l$ and in case of joint power level, the total number of power levels is $2L_l M_l$.

In embodiment 2, the codebook components in Table 1 can be divided into three subsets, a first subset (S1), a second subset (S2), and a third subset (S3), and a UE is configured with the first subset (S1) (either via higher layer RRC signaling or MAC CE based signaling or DCI based signaling), and the third subset (S3) is fixed. The UE uses the first subset (S1) and the third subset (S3) to derive the second subset (S2) of codebook components in Table 1, according to the above-mentioned framework (Eq. 5 or 5A). In one example, the first subset (S1) of the codebook components is obtained (e.g., by the gNB) based on the UL channel estimated using SRS transmission from the UE, and the derived first subset (S1) is configured to the UE. The three subsets may be disjoint, i.e., they do not have any common components. Alternatively, they may have at least one common component. The rest of the details of this embodiment (including the two-part UCI design) are the same as embodiment 1.

In one alternative, the codebook components (that are not configured via the first subset S1) are partitioned into two subsets, the second subset (S2) including components reported by the UE and the third subset (S3) including components that are fixed. A few examples of the three subsets according to this alternative are shown in Table 19.

TABLE 19

| | Codebook components from Table 1 | | |
|---|---|---|---|
| Example | First subset (S1) | Second subset (S2) | Third subset (S3) |
| 2-0 | {0, 1} | 5-7 | 2-4 |
| 2-1 | 0-4 | 5, 7 | 6 |
| 2-2 | {0, 2, 4} | {5-7} | {1, 3} |
| 2-3 | {1, 3, 4} | {5-7} | {0, 2} |
| 2-4 | 0-3 | 5-7 | 4 |
| 2-5 | 2-4 | {5, 7} | {0, 1, 6} |
| 2-6 | {0, 2} | {5-7} | {1, 3, 4} |
| 2-7 | {1, 3} | {5-7} | {0, 2, 4} |
| 2-8 | {2, 3} | {5-7} | {0, 1, 4} |
| 2-9 | {3, 4} | {5-7} | {0-2} |
| 2-10 | 3 | {5-7} | {0-2, 4} |

In embodiment 2A, a variation of embodiment 2, the first subset (S1) of the codebook components is fixed (hence, neither configured to the UE nor reported by the UE) and the third subset (S3) is configured (either via higher layer RRC signaling or MAC CE based signaling or DCI based signaling). In this variation, the codebook components in set S1 can be obtained by the gNB (NW) based on the UL channel estimated using SRS transmission from the UE. Likewise, the codebook components in set S1 can be obtained by the UE based on the DL channel estimated using CSI-RS transmission from the gNB. If the codebook components in set S1 are reciprocal between DL and UL channel estimates, then these components need not be reported by the UE (to the gNB) or configured to the UE (by the gNB) since they can be obtained using SRS or CSI-RS transmissions. The rest of the details of this embodiment (including the two-part UCI design) are the same as embodiment 1.

In embodiment 2B, a variation of embodiment 2, when the subset S1 includes SD basis but not FD/TD basis, then it also includes power level for each of SD beams included in this SD basis. Likewise, when the subset S1 includes FD/TD basis but not SD basis, then it also includes power level for each of FD/TD beams included in this FD/TD basis. When the subset S1 includes both SD basis and FD/TD basis, then it either includes separate power levels for SD and FD bases, i.e., SD power level for each of SD beams included in this SD basis and FD/TD power level for each of FD/TD beams included in this FD/TD basis, or includes a joint power level for all combinations of SD and FD/TD beam combinations. Note that in case of separate power level, the total number of power levels is $2L_l+M_l$ and in case of joint power level, the total number of power levels is $2L_lM_l$.

In embodiment 3, when the codebook components can be divided into two sets (cf. embodiment 1), a first subset (S1) of the codebook components is reported by the UE in a first CSI report, and a second subset (S2) of the codebook components is reported by the UE in a second CSI report, where the second CSI report is reported according to embodiment 1, in particular, according to the two-part UCI design.

In one example, there is no coupling (linking) between the first and second CSI reports, i.e., the two CSI reports are configured independently via two different CSI configurations. In another example, the first and second CSI reports are coupled (linked). For example, one common (joint) CSI configuration is used to configure both CSI reports. Or, two CSI configurations are used for the two CSI reports, but there is some coupling (linking) between the two configurations. For example, the two configurations can be linked via either only (i) resource setting, or only (ii) CSI reporting setting, or only (iii) measurement setting, or (i) and (ii), or (i) and (iii), or (ii) and (iii), or (i), (ii), and (iii).

In embodiment 4, when all codebook components can be divided into three sets (cf. embodiment 2), a first subset (S1) of the codebook components is reported by the UE in a first CSI report, a second subset (S2) of the codebook components is reported by the UE in a second CSI report, and a third subset (S3) of the codebook components is reported by the UE in a third CSI report, where the second CSI report is reported according to embodiment 1, in particular, according to the two-part UCI design.

In one example, there is no coupling (linking) between the three CSI reports, i.e., the three CSI reports are configured independently via three different CSI configurations. In another example, at least two of the three CSI reports (e.g., the first and second CSI reports) are coupled (linked). For example, one common (joint) CSI configuration is used to configure the at least two of the three CSI reports. Or, at least two CSI configurations are used for the at least two of the three CSI reports, but there is some coupling (linking) between the at least two configurations. For example, the two configurations can be linked via either only (i) resource setting, or only (ii) CSI reporting setting, or only (iii) measurement setting, or (i) and (ii), or (i) and (iii), or (ii) and (iii), or (i), (ii), and (iii).

In embodiment 4A, a variation of embodiment ¾, the first subset (S1) is configured to the UE (either via higher layer RRC signaling or MAC CE based signaling or DCI based signaling), and the second and third subsets are reported by the UE in a first and a second CSI reports, respectively, where the second CSI report is reported according to embodiment 1, in particular, according to the two-part UCI design. The rest of the details of this embodiment (including the CSI configuration for the two CSI reports) are the same as embodiment ¾.

In embodiment 4B, a variation of embodiment ¾, the first subset (S1) is fixed, and the second and third subsets are reported by the UE in a first and a second CSI reports, respectively, where the second CSI report is reported according to embodiment 1, in particular, according to the two-part UCI design. The rest of the details of this embodiment (including the CSI configuration for the two CSI reports) are the same as embodiment ¾.

In embodiment 4C, a variation of embodiment ¾, the third subset (S3) is configured to the UE (either via higher layer RRC signaling or MAC CE based signaling or DCI based signaling), and the first and second subsets are reported by the UE in a first and a second CSI reports, respectively, where the second CSI report is reported according to embodiment 1, in particular, according to the two-part UCI design. The rest of the details of this embodiment (including the CSI configuration for the two CSI reports) are the same as embodiment ¾.

In embodiment 4D, a variation of embodiment ¾, the third subset (S3) is fixed, and the first and second subsets are reported by the UE in a first and a second CSI reports, respectively, where the second CSI report is reported according to embodiment 1, in particular, according to the two-part UCI design. The rest of the details of this embodiment (including the CSI configuration for the two CSI reports) are the same as embodiment ¾.

In embodiment 4E, RI reporting in embodiments of this disclosure (e.g., embodiment 3/4/4A/4B4C/4D) is according to at least one of the following alternatives.

In one alternative Alt 4E-0: RI is included only in the CSI report including the second subset (S2), and is reported via UCI part 1 (as shown in FIG. 14).

In one alternative Alt 4E-1: RI is included in the CSI report including the second subset (S2), and is reported via UCI part 1 (as shown in FIG. 14). In addition, a separate RI is reported in each of the other CSI reports (including first or/and third subsets).

In one alternative Alt 4E-2: RI is not included in the CSI report including the second subset (S2), and hence is not reported via UCI part 1 (RI is removed from UCI part 1 of FIG. 14). The RI value is either configured to the UE. Or, The RI value is reported in at least one of the other CSI reports (including first or/and third subsets).

In one alternative Alt 4E-3: RI is included in the CSI report including the second subset (S2), and is reported via UCI part 1 (as shown in FIG. 14). In addition, this RI value (for example "x") depends on another RI value (for example "y") included in another CSI report, e.g., x<=y. In one example, the another CSI report is the first CSI report including the first subset (S1). In one example, the another CSI report is the third CSI report including the third subset (S3).

In embodiment 4F, $K_{NZ}$ reporting in embodiments of this disclosure (e.g., embodiment 3/4/4A/4B4C/4D) is according to at least one of the following alternatives.

In one alternative Alt 4F-0: $K_{NZ}$ is included only in the CSI report including the second subset (S2), and is reported via UCI part 1 (as shown in FIG. 14).

In one alternative Alt 4F-1: $K_{NZ}$ is not included in the CSI report including the second subset (S2), and hence is not reported via UCI part 1 ($K_{NZ}$ is removed from UCI part 1 of FIG. 14). The $K_{NZ}$ value is either configured to the UE, or the $K_{NZ}$ value is reported in at least one of the other CSI reports (including first or/and third subsets).

In one alternative Alt 4F-2: $K_{NZ}$ is included in the CSI report including the second subset (S2), and is reported via UCI part 1 (as shown in FIG. 14). In addition, this $K_{NZ}$ value (say x) depends on another $K_{NZ}$ value (say y) included in another CSI report, e.g., x<=y. In one example, the another CSI report is the first CSI report including the first subset (S1). In one example, the another CSI report is the third CSI report including the third subset (S3).

Figure 15:
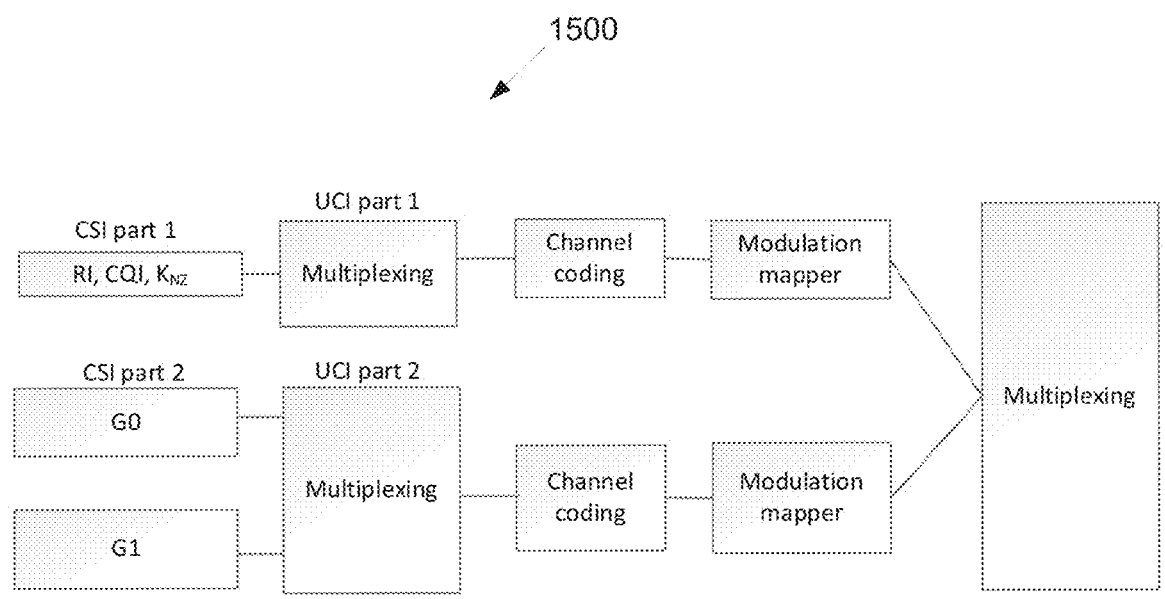
FIG. 15 illustrates an example of a two-part UCI multiplexing process, as may be performed by a UE, according to embodiments of the present disclosure.

FIG. 15 illustrates an example two-part UCI multiplexing process 1500 according to embodiments of the present disclosure, as may be performed by a UE such as UE 116. The embodiment of the two-part UCI multiplexing process 1500 illustrated in FIG. 15 is for illustration only. FIG. 15 does not limit the scope of this disclosure to any particular implementation of the process 1500.

through Table 24 for the codebook components according to example D.1 through D.4 respectively (that are based on Table 3). A few examples of groups G0 and G1 are shown in Table 25 through Table 28 for the codebook components according to example E.1 through E.4 respectively (that are based on Table 4). A few examples of groups G0 and G1 are shown in Table 29 through Table 32 for the codebook components according to example F.1 through F.4 respectively (that are based on Table 5).

TABLE 20

Codebook components from Table 1

| Example | Second subset (S2) | G0 | G1 |
|---|---|---|---|
| 5-0 | 2-7 | SD basis, SCI(s) | FD basis, bitmap(s), amplitude and phase of NZ coefficients |
| 5-1 | | SD basis, SCI(s), bitmap(s) | FD basis, amplitude and phase of NZ coefficients |
| 5-2 | | SD basis, FD basis, SCI(s) | bitmap(s), amplitude and phase of NZ coefficients |
| 5-3 | | SD basis, FD basis, SCI(s), bitmap(s) | amplitude and phase of NZ coefficients |
| 5-4 | | SD basis, FD basis, SCI(s), bitmap(s), amplitude and phase of NZ coefficients in G0 | amplitude and phase of NZ coefficients in G1 |
| 5-5 | | SD basis, FD basis, SCI(s), $1^{st}$ part of bitmap(s), amplitude and phase of NZ coefficients in G0 | $2^{nd}$ part of bitmap(s), amplitude and phase of NZ coefficients in G1 |
| 5-6 | 5-7 | SCI(s) | amplitude and phase of NZ coefficients |
| 5-7 | | SCI(s), amplitude and phase of NZ coefficients in G0 | amplitude and phase of NZ coefficients in G1 |
| 5-8 | 4-7 | SCI(s) | bitmap(s), amplitude and phase of NZ coefficients |
| 5-9 | | SCI(s), bitmap(s) | amplitude and phase of NZ coefficients |
| 5-10 | | SCI(s), bitmap(s), amplitude and phase of NZ coefficients in G0 | amplitude and phase of NZ coefficients in G1 |
| 5-11 | | SCI(s), $1^{st}$ part of bitmap(s), amplitude and phase of NZ coefficients in G0 | $2^{nd}$ part of bitmap(s), amplitude and phase of NZ coefficients in G1 |

As illustrated in FIG. 15, in embodiment 5, which is an extension of embodiments 1-4 of this disclosure, the UE is configured to use a two-part UCI to multiplex and report a CSI report including only the second subset (S2) of codebook components, wherein the details of the two-part UCI is according to embodiments 1-4, except that the CSI part 2 is further segmented in two segments or groups (G0, G1):

Group G0: comprising a subset (S21) of the second subset (S2); and

Group G1: comprising a subset (S22) of the second subset (S2).

The rest of the details of embodiments 1-4 are applicable to this embodiment too. When the UL resource allocation (RA) for UCI part 2 reporting is sufficient (i.e., the number of bits allocated for UCI part 2 transmission is equal to or greater than the number of bits required for UCI part 2 transmission), then full CSI part 2 (i.e., G0, G1) is transmitted. When the UL RA is not sufficient (i.e., the number of bits allocated for UCI part 2 transmission is less than the number of bits required for UCI part 2 transmission), then a portion of CSI part 2 is omitted (not transmitted), and the remaining (partial) CSI part 2 is transmitted, wherein the omission order is in the following order: G1 then G0.

A few examples of groups G0 and G1 are shown in Table 20 for the codebook components from Table 1. A few examples of groups G0 and G1 are shown in Table 21

TABLE 21

Codebook components from Table 3

| Example | Second subset (S2) | G0 | G1 |
|---|---|---|---|
| 5-0 | {0, 1, . . . , 6} | {0, 1, 2, 3} | {4, 5, 6} |
| 5-1 | | {0, 1, 3} | {2, 4, 5, 6} |
| 5-2 | | {0, 1, 2} | {3, 4, 5, 6} |
| 5-3 | {1, . . . , 6} | {1, 2, 3} | {4, 5, 6} |
| 5-4 | | {1, 3} | {2, 4, 5, 6} |
| 5-5 | | {1, 2} | {3, 4, 5, 6} |
| 5-6 | {0, 2, 3, . . . , 6} | {0, 2, 3} | {4, 5, 6} |
| 5-7 | | {0, 3} | {2, 4, 5, 6} |
| 5-8 | | {0, 2} | {3, 4, 5, 6} |
| 5-9 | {0, 3, 4, 5, 6} | {0, 3} | {4, 5, 6} |
| 5-10 | | {0} | {3, 4, 5, 6} |
| 5-11 | {1, 3, 4, 5, 6} | {1, 3} | {4, 5, 6} |
| 5-12 | | {1} | {3, 4, 5, 6} |
| 5-13 | {3, 4, 5, 6} | {3} | {4, 5, 6} |

TABLE 22

Codebook components from Table 3

| Example | Second subset (S2) | G0 | G1 |
|---|---|---|---|
| 5-0 | {0, 1, 2, 3, 5, 6} | {0, 1, 2, 3} | {5, 6} |
| 5-1 | | {0, 1, 3} | {2, 5, 6} |

TABLE 22-continued

Codebook components from Table 3

| Example | Second subset (S2) | G0 | G1 |
|---|---|---|---|
| 5-2 |  | {0, 1, 2} | {3, 5, 6} |
| 5-3 | {1, 2, 3, 5, 6} | {1, 2, 3} | {5, 6} |
| 5-4 |  | {1, 3} | {2, 5, 6} |
| 5-5 |  | {1, 2} | {3, 5, 6} |
| 5-6 | {0, 2, 3, 5, 6} | {0, 2, 3} | {5, 6} |
| 5-7 |  | {0, 3} | {2, 5, 6} |
| 5-8 |  | {0, 2} | {3, 5, 6} |
| 5-9 | {0, 3, 5, 6} | {0, 3} | {5, 6} |
| 5-10 |  | {0} | {3, 5, 6} |
| 5-11 | {1, 3, 5, 6} | {1, 3} | {5, 6} |
| 5-12 |  | {1} | {3, 5, 6} |
| 5-13 | {3, 5, 6} | {3} | {5, 6} |

TABLE 23

Codebook components from Table 3

| Example | Second subset (S2) | G0 | G1 |
|---|---|---|---|
| 5-0 | {0, 1, 3, . . . , 6} | {0, 1, 3} | {4, 5, 6} |
| 5-1 |  | {0, 1} | {3, 4, 5, 6} |
| 5-2 | {1, 3, . . . , 6} | {1, 3} | {4, 5, 6} |
| 5-3 |  | {1} | {3, 4, 5, 6} |
| 5-4 | {0, 3, . . . , 6} | {0, 3} | {4, 5, 6} |
| 5-5 |  | {0} | {3, 4, 5, 6} |
| 5-6 | {3, 4, 5, 6} | {3} | {4, 5, 6} |

TABLE 24

Codebook components from Table 3

| Example | Second subset (S2) | G0 | G1 |
|---|---|---|---|
| 5-0 | {0, 1, 3, 5, 6} | {0, 1, 3} | {5, 6} |
| 5-1 |  | {0, 1} | {3, 5, 6} |
| 5-2 | {1, 3, 5, 6} | {1, 3} | {5, 6} |
| 5-3 |  | {1} | {3, 5, 6} |
| 5-4 | {0, 3, 5, 6} | {0, 3} | {5, 6} |
| 5-5 |  | {0} | {3, 5, 6} |
| 5-6 | {3, 5, 6} | {3} | {5, 6} |

TABLE 25

Codebook components from Table 4

| Example | Second subset (S2) | G0 | G1 |
|---|---|---|---|
| 5-0 | {0, 2, . . . , 6} | {0, 2, 3} | {4, 5, 6} |
| 5-1 |  | {0, 3} | {2, 4, 5, 6} |
| 5-2 |  | {0, 2} | {3, 4, 5, 6} |
| 5-3 | {2, . . . , 6} | {2, 3} | {4, 5, 6} |
| 5-4 |  | {3} | {2, 4, 5, 6} |
| 5-5 |  | {2} | {3, 4, 5, 6} |
| 5-6 | {0, 3, 4, 5, 6} | {0, 3} | {4, 5, 6} |
| 5-7 |  | {0} | {3, 4, 5, 6} |
| 5-8 | {3, 4, 5, 6} | {3} | {4, 5, 6} |

TABLE 26

Codebook components from Table 4

| Example | Second subset (S2) | G0 | G1 |
|---|---|---|---|
| 5-0 | {0, 2, 3, 5, 6} | {0, 2, 3} | {5, 6} |
| 5-1 |  | {0, 3} | {2, 5, 6} |
| 5-2 |  | {0, 2} | {3, 5, 6} |
| 5-3 | {2, 3, 5, 6} | {2, 3} | {5, 6} |

TABLE 26-continued

Codebook components from Table 4

| Example | Second subset (S2) | G0 | G1 |
|---|---|---|---|
| 5-4 |  | {3} | {2, 5, 6} |
| 5-5 |  | {2} | {3, 5, 6} |
| 5-6 | {0, 3, 5, 6} | {0, 3} | {5, 6} |
| 5-7 |  | {0} | {3, 5, 6} |
| 5-8 | {3, 5, 6} | {3} | {5, 6} |

TABLE 27

Codebook components from Table 4

| Example | Second subset (S2) | G0 | G1 |
|---|---|---|---|
| 5-0 | {0, 3, 4, 5, 6} | {0, 4, 3} | {5, 6} |
| 5-1 |  | {0, 3} | {4, 5, 6} |
| 5-2 |  | {0, 4} | {3, 5, 6} |
| 5-3 | {3, 4, 5, 6} | {3, 4} | {5, 6} |
| 5-4 |  | {3} | {4, 5, 6} |
| 5-5 |  | {4} | {3, 5, 6} |

TABLE 28

Codebook components from Table 4

| Example | Second subset (S2) | G0 | G1 |
|---|---|---|---|
| 5-0 | {0, 3, 5, 6} | {0, 3} | {5, 6} |
| 5-1 |  | {0} | {3, 5, 6} |
| 5-3 | {3, 5, 6} | {3} | {5, 6} |

TABLE 29

Codebook components from Table 5

| Example | Second subset (S2) | G0 | G1 |
|---|---|---|---|
| 5-0 | {0, 1, . . . , 5} | {0, 1, 2, 3} | {4, 5} |
| 5-1 |  | {0, 1, 3} | {2, 4, 5} |
| 5-2 |  | {0, 1, 2} | {3, 4, 5} |
| 5-3 | {1, . . . , 5} | {1, 2, 3} | {4, 5} |
| 5-4 |  | {1, 3} | {2, 4, 5} |
| 5-5 |  | {1, 2} | {3, 4, 5} |
| 5-6 | {0, 2, 3, 4, 5} | {0, 2, 3} | {4, 5} |
| 5-7 |  | {0, 3} | {2, 4, 5} |
| 5-8 |  | {0, 2} | {3, 4, 5} |
| 5-9 | {2, 3, 4, 5} | {3} | {2, 4, 5} |
| 5-10 |  | {2} | {3, 4, 5} |

TABLE 30

Codebook components from Table 5

| Example | Second subset (S2) | G0 | G1 |
|---|---|---|---|
| 5-0 | {0, 1, 2, 4, 5} | {0, 1, 2} | {4, 5} |
| 5-1 |  | {0, 1} | {2, 4, 5} |
| 5-2 | {1, 2, 4, 5} | {1, 2} | {4, 5} |
| 5-3 |  | {1} | {2, 5, 6} |
| 5-4 | {0, 2, 4, 5} | {0, 2} | {4, 5} |
| 5-5 |  | {0} | {2, 4, 5} |
| 5-6 | {2, 4, 5} | {2} | {4, 5} |

TABLE 31

| Example | Second subset (S2) | Codebook components from Table 5 G0 | G1 |
|---|---|---|---|
| 5-0 | {0, 2, 3, 4, 5} | {0, 2, 3} | {4, 5} |
| 5-1 |  | {0, 2} | {3, 4, 5} |
| 5-2 | {2, 3, 4, 5} | {2, 3} | {4, 5} |
| 5-3 |  | {2} | {3, 5, 6} |

TABLE 32

| Example | Second subset (S2) | Codebook components from Table 5 G0 | G1 |
|---|---|---|---|
| 5-0 | {0, 2, 4, 5} | {0, 2} | {4, 5} |
| 5-1 |  | {0} | {2, 4, 5} |
| 5-2 | {2, 4, 5} | {2} | {4, 5} |

In one example, to determine NZ coefficients in G0 and G1, the NZ LC coefficients are prioritized from high to low priority according to (l,i,m) index triplet. The $\lceil K_{NZ}/2 \rceil$ highest priority coefficients belong to G0 and the $\lfloor K_{NZ}/2 \rfloor$ lowest priority coefficients belong to G1. The priority level is calculated as $P(l,i,m)=2L \cdot v \cdot F_1(m)+v \cdot F_2(i)+l$, where $F_1$ and $F_2$ are fixed permutation functions for FD and SD indices. Note that $F_1(m)=m$ if there is no permutation in FD. Likewise, $F_2(i)=i$ if there is no permutation in SD. If priority levels of two coefficients $c_{l_1,i_1,m_1}$ and $c_{l_2,i_2,m_2}$ are such that $P(l_2,i_2,m_2) < P(l_1, i_1, m_1)$, then $c_{l_2,i_2,m_2}$ has a higher priority over $c_{l_1,i_1,m_1}$. In another example, the number of NZ coefficients in G0 and G1 are $N_0$ and $N_1$, respectively, where $N_0+N_1=K_{NZ}$.

In one example, a reference amplitude for weaker polarization is also included in G0. In another example, a reference amplitude for weaker polarization is also included in G0 if amplitude and phase of some NZ coefficients are included in G0, and a reference amplitude for weaker polarization is included in G1, otherwise.

In one example (e.g., Ex 5-5, 5-11), the bitmap(s) are partitioned into two parts, $1^{st}$ part and $2^{nd}$ part, that may or may not be equal in length (size), and the $1^{st}$ part of the bitmap(s) is included in G0 and the $2^{nd}$ part of the bitmap(s) is included in G1.

Figure 16:
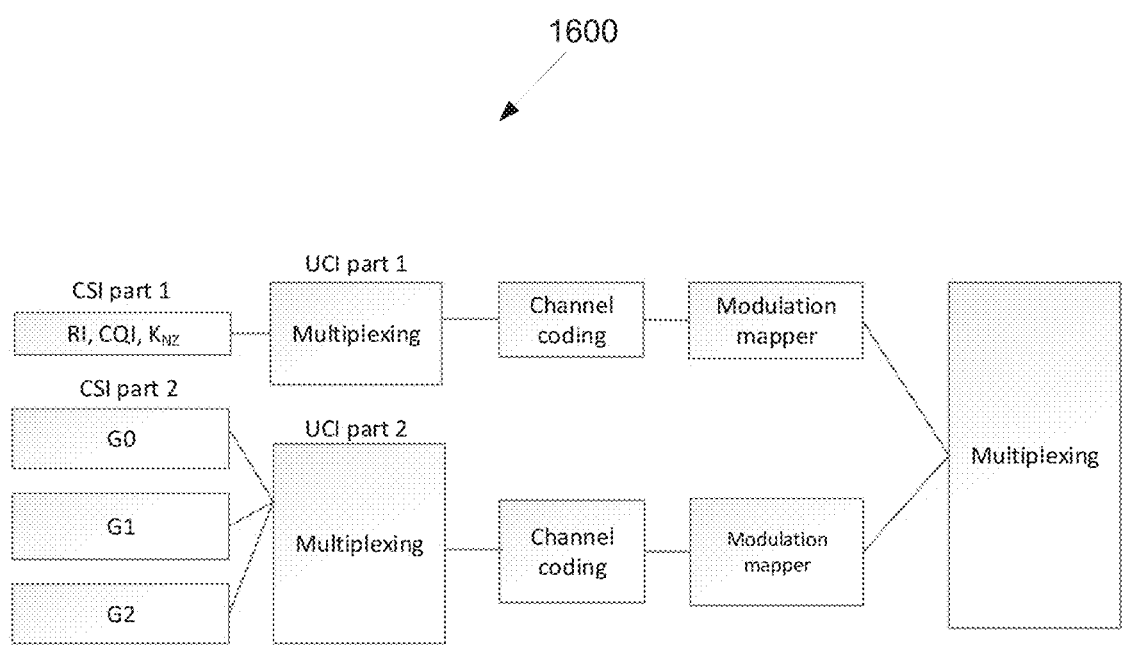
FIG. 16 illustrates an example of a two-part UCI multiplexing process, as may be performed by a UE, according to embodiments of the present disclosure.

FIG. 16 illustrates an example two-part UCI multiplexing process 1600 according to embodiments of the present disclosure, as may be performed by a UE such as UE 116. The embodiment of the two-part UCI multiplexing process 1600 illustrated in FIG. 16 is for illustration only. FIG. 16 does not limit the scope of this disclosure to any particular implementation of the process 1600.

As illustrated in FIG. 16, in embodiment 6, which is an extension of embodiments 1-4 of this disclosure, the UE is configured to use a two-part UCI to multiplex and report a CSI report including only the second subset (S2) of codebook components, wherein the details of the two-part UCI is according to embodiments 1-4, except that the CSI part 2 is further segmented in three segments or groups (G0, G1, G2):

Group G0: comprising a subset (S21) of the second subset (S2); and

Group G1: comprising a subset (S22) of the second subset (S2); and

Group G2: comprising a subset (S23) of the second subset (S2).

The rest of the details of embodiments 1-4 are applicable to this embodiment too. When the UL resource allocation (RA) for UCI part 2 reporting is sufficient (i.e., the number of bits allocated for UCI part 2 transmission is equal to or greater than the number of bits required for UCI part 2 transmission), then full CSI part 2 (i.e., G0, G1, G2) is transmitted. When the UL RA is no sufficient (i.e., the number of bits allocated for UCI part 2 transmission is less than the number of bits required for UCI part 2 transmission), then a portion of CSI part 2 is omitted (not transmitted), and the remaining (partial) CSI part 2 is transmitted, wherein the omission order is in the following order: G2 then G1 then G0.

A few examples of groups G0, G1, and G2 are shown in Table 33 for the codebook components from Table 1. A few examples of groups G0, G1, and G2 are shown in Table 34 through Table 37 for the codebook components according to example D.1 through D.4 respectively (that are based on Table 3). A few examples of groups G0 and G1 are shown in Table 38 through Table 41 for the codebook components according to example E.1 through E.4 respectively (that are based on Table 4). A few examples of groups G0 and G1 are shown in Table 42 through Table 45 for the codebook components according to example F.1 through F.4 respectively (that are based on Table 5).

TABLE 33

| Example | Second subset (S2) | Codebook components from Table 1 G0 | G1 | G2 |
|---|---|---|---|---|
| 6-0 | 2-7 | SD basis, SCI(s) | FD basis, bitmap(s), amplitude and phase of NZ coefficients in G1 | amplitude and phase of NZ coefficients in G2 |
| 6-1 |  | SD basis, SCI(s), bitmap(s) | FD basis, amplitude and phase of NZ coefficients in G1 | amplitude and phase of NZ coefficients in G2 |
| 6-2 |  | SD basis, FD basis, SCI(s) | bitmap(s), amplitude and phase of NZ coefficients in G1 | amplitude and phase of NZ coefficients in G2 |
| 6-3 |  | SD basis, FD basis, SCI(s), bitmap(s) | amplitude and phase of NZ coefficients in G1 | amplitude and phase of NZ coefficients in G2 |
| 6-4 |  | SD basis, SCI(s) | FD basis, $1^{st}$ part of bitmap(s), amplitude and phase of NZ coefficients in G1 | $2^{nd}$ part of bitmap(s), amplitude and phase of NZ coefficients in G2 |
| 6-5 | 5-7 | SCI(s) | amplitude and phase of NZ coefficients in G1 | amplitude and phase of NZ coefficients in G2 |
| 6-6 | 4-7 | SCI(s) | bitmap(s), amplitude and phase of NZ coefficients in G1 | amplitude and phase of NZ coefficients in G2 |
| 6-7 |  | SCI(s), bitmap(s) | amplitude and phase of NZ coefficients in G1 | amplitude and phase of NZ coefficients in G2 |
| 6-8 |  | SCI(s) | $1^{st}$ part of bitmap(s), amplitude and phase of NZ coefficients in G1 | $2^{nd}$ part of bitmap(s), amplitude and phase of NZ coefficients in G2 |

TABLE 34

| Example | Second subset (S2) | G0 | G1 | G2 |
|---|---|---|---|---|
| 6-0 | {0, 1, ..., 6} | {0, 3} | {1, 4}, higher priority components of {2, 5, 6} | lower priority components of {2, 5, 6} |
| 6-1 | | {0, 1, 3} | {4}, higher priority components of {2, 5, 6} | lower priority components of {2, 5, 6} |
| 6-2 | | {0, 3} | {1, 4, 2}, higher priority components of {5, 6} | lower priority components of {5, 6} |
| 6-3 | {1, ..., 6} | {3} | {1, 4}, higher priority components of {2, 5, 6} | lower priority components of {2, 5, 6} |
| 6-4 | | {1, 3} | {4}, higher priority components of {2, 5, 6} | lower priority components of {2, 5, 6} |
| 6-5 | | {3} | {1, 4, 2}, higher priority components of {5, 6} | lower priority components of {5, 6} |
| 6-6 | {0, 2, 3, ..., 6} | {0, 3} | {4}, higher priority components of {2, 5, 6} | lower priority components of {2, 5, 6} |
| 6-7 | | {0, 3} | {4, 2}, higher priority components of {5, 6} | lower priority components of {5, 6} |
| 7-8 | {0, 3, 4, 5, 6} | {0, 3} | {4}, higher priority components of {5, 6} | lower priority components of {5, 6} |
| 6-9 | {1, 3, 4, 5, 6} | {3} | {1, 4}, higher priority components of {5, 6} | lower priority components of {5, 6} |
| 6-10 | | {1, 3} | {4}, higher priority components of {5, 6} | lower priority components of {5, 6} |
| 6-11 | {3, 4, 5, 6} | {3} | {4}, higher priority components of {5, 6} | lower priority components of {5, 6} |

TABLE 35

| Example | Second subset (S2) | G0 | G1 | G2 |
|---|---|---|---|---|
| 6-0 | {0, 1, 2, 3, 5, 6} | {0, 3} | {1}, higher priority components of {2, 5, 6} | lower priority components of {2, 5, 6} |
| 6-1 | | {0, 1, 3} | higher priority components of {2, 5, 6} | lower priority components of {2, 5, 6} |
| 6-2 | | {0, 3} | {1, 2}, higher priority components of {5, 6} | lower priority components of {5, 6} |
| 6-3 | {1, 2, 3, 5, 6} | {3} | {1}, higher priority components of {2, 5, 6} | lower priority components of {2, 5, 6} |
| 6-4 | | {1, 3} | higher priority components of {2, 5, 6} | lower priority components of {2, 5, 6} |
| 6-5 | | {3} | {1, 2}, higher priority components of {5, 6} | lower priority components of {5, 6} |
| 6-6 | {0, 2, 3, 5, 6} | {0, 3} | higher priority components of {2, 5, 6} | lower priority components of {2, 5, 6} |
| 6-7 | | {0, 3} | {2}, higher priority components of {5, 6} | lower priority components of {5, 6} |
| 7-8 | {0, 3, 5, 6} | {0, 3} | higher priority components of {5, 6} | lower priority components of {5, 6} |
| 6-9 | {1, 3, 5, 6} | {3} | {1}, higher priority components of {5, 6} | lower priority components of {5, 6} |
| 6-10 | | {1, 3} | higher priority components of {5, 6} | lower priority components of {5, 6} |
| 6-11 | {3, 5, 6} | {3} | higher priority components of {5, 6} | lower priority components of {5, 6} |

TABLE 36

| Example | Second subset (S2) | G0 | G1 | G2 |
|---|---|---|---|---|
| 6-0 | {0, 1, 3, 4, 5, 6} | {0, 3} | {1, 4}, higher priority components of {5, 6} | lower priority components of {5, 6} |
| 6-1 | | {0, 1, 3} | {4}, higher priority components of {5, 6} | lower priority components of {5, 6} |
| 6-2 | {1, 3, 4, 5, 6} | {3} | {1, 4}, higher priority components of {5, 6} | lower priority components of {5, 6} |
| 6-3 | | {1, 3} | {4}, higher priority components of {5, 6} | lower priority components of {5, 6} |
| 6-4 | {0, 3, ..., 6} | {0, 3} | {4}, higher priority components of {5, 6} | lower priority components of {5, 6} |
| 6-5 | {3, 4, 5, 6} | {3} | {4}, higher priority components of {5, 6} | lower priority components of {5, 6} |

TABLE 37

| | | Codebook components from Table 3 | | |
|---|---|---|---|---|
| Example | Second subset (S2) | G0 | G1 | G2 |
| 6-0 | {0, 1, 3, 5, 6} | {0, 3} | {1}, higher priority components of {5, 6} | lower priority components of {5, 6} |
| 6-1 | | {0, 1, 3} | higher priority components of {5, 6} | lower priority components of {5, 6} |
| 6-2 | {1, 3, 5, 6} | {3} | {1}, higher priority components of {5, 6} | lower priority components of {5, 6} |
| 6-3 | | {1, 3} | higher priority components of {5, 6} | lower priority components of {5, 6} |
| 6-4 | {0, 3, 5, 6} | {0, 3} | higher priority components of {5, 6} | lower priority components of {5, 6} |
| 6-5 | {3, 5, 6} | {3} | higher priority components of {5, 6} | lower priority components of {5, 6} |

TABLE 38

| | | Codebook components from Table 4 | | |
|---|---|---|---|---|
| Example | Second subset (S2) | G0 | G1 | G2 |
| 6-0 | {0, 2, ..., 6} | {0, 3} | {4}, higher priority components of {2, 5, 6} | lower priority components of {2, 5, 6} |
| 6-1 | | {0, 3} | {4, 2}, higher priority components of {5, 6} | lower priority components of {5, 6} |
| 6-2 | {2, ..., 6} | {3} | {4}, higher priority components of {2, 5, 6} | lower priority components of {2, 5, 6} |
| 6-3 | | {3} | {4, 2}, higher priority components of {5, 6} | lower priority components of {5, 6} |
| 6-4 | {0, 3, ..., 6} | {0, 3} | {4}, higher priority components of {5, 6} | lower priority components of {5, 6} |
| 6-5 | {3, 4, 5, 6} | {3} | {4}, higher priority components of {5, 6} | lower priority components of {5, 6} |

TABLE 39

| | | Codebook components from Table 4 | | |
|---|---|---|---|---|
| Example | Second subset (S2) | G0 | G1 | G2 |
| 6-0 | {0, 2, 3, 5, 6} | {0, 3} | higher priority components of {2, 5, 6} | lower priority components of {2, 5, 6} |
| 6-1 | | {0, 3} | {2}, higher priority components of {5, 6} | lower priority components of {5, 6} |
| 6-2 | {2, 3, 5, 6} | {3} | higher priority components of {2, 5, 6} | lower priority components of {2, 5, 6} |
| 6-3 | | {3} | {2}, higher priority components of {5, 6} | lower priority components of {5, 6} |
| 6-4 | {0, 3, 5, 6} | {0, 3} | higher priority components of {5, 6} | lower priority components of {5, 6} |
| 6-5 | {3, 5, 6} | {3} | higher priority components of {5, 6} | lower priority components of {5, 6} |

TABLE 40

| | | Codebook components from Table 4 | | |
|---|---|---|---|---|
| Example | Second subset (S2) | G0 | G1 | G2 |
| 6-0 | {0, 3, 4, 5, 6} | {0, 3} | {4}, higher priority components of {5, 6} | lower priority components of {5, 6} |
| 6-1 | {3, 4, 5, 6} | {3} | {4}, higher priority components of {5, 6} | lower priority components of {5, 6} |

TABLE 41

| | | Codebook components from Table 4 | | |
|---|---|---|---|---|
| Example | Second subset (S2) | G0 | G1 | G2 |
| 6-0 | {0, 3, 5, 6} | {0, 3} | higher priority components of {5, 6} | lower priority components of {5, 6} |
| 6-1 | {3, 5, 6} | {3} | higher priority components of {5, 6} | lower priority components of {5, 6} |

TABLE 42

| | | Codebook components from Table 5 | | |
|---|---|---|---|---|
| Example | Second subset (S2) | G0 | G1 | G2 |
| 6-0 | {0, 1, ..., 5} | {0, 2} | {3}, higher priority components of {1, 4, 5} | lower priority components of {1, 4, 5} |
| 6-1 | | {0, 2} | {3, 1}, higher priority components of {4, 5} | lower priority components of {4, 5} |
| 6-2 | {1, ..., 5} | {2} | {3}, higher priority components of {1, 4, 5} | lower priority components of {1, 4, 5} |
| 6-3 | | {2} | {3, 1}, higher priority components of {4, 5} | lower priority components of {4, 5} |
| 6-4 | {0, 2, ..., 5} | {0, 2} | {3}, higher priority components of {4, 5} | lower priority components of {4, 5} |
| 6-5 | {2, 3, 4, 5} | {2} | {3}, higher priority components of {4, 5} | lower priority components of {4, 5} |

TABLE 43

| | | Codebook components from Table 5 | | |
|---|---|---|---|---|
| Example | Second subset (S2) | G0 | G1 | G2 |
| 6-0 | {0, 1, 2, 4, 5} | {0, 2} | higher priority components of {1, 4, 5} | lower priority components of {1, 4, 5} |
| 6-1 | | {0, 2} | {1}, higher priority components of {4, 5} | lower priority components of {4, 5} |
| 6-2 | {1, 2, 4, 5} | {2} | higher priority components of {1, 4, 5} | lower priority components of {1, 4, 5} |
| 6-3 | | {2} | {1}, higher priority components of {4, 5} | lower priority components of {4, 5} |
| 6-4 | {0, 2, 4, 5} | {0, 2} | higher priority components of {4, 5} | lower priority components of {4, 5} |
| 6-5 | {2, 4, 5} | {2} | higher priority components of {4, 5} | lower priority components of {4, 5} |

TABLE 44

Codebook components from Table 5

| Example | Second subset (S2) | G0 | G1 | G2 |
|---|---|---|---|---|
| 6-0 | {0, 2, 3, 4, 5} | {0, 2} | {3}, higher priority components of {4, 5} | lower priority components of {4, 5} |
| 6-1 | {2, 3, 4, 5} | {2} | {3}, higher priority components of {4, 5} | lower priority components of {4, 5} |

TABLE 45

Codebook components from Table 5

| Example | Second subset (S2) | G0 | G1 | G2 |
|---|---|---|---|---|
| 6-0 | {0, 2, 4, 5} | {0, 2} | higher priority components of {4, 5} | lower priority components of {4, 5} |
| 6-1 | {2, 4, 5} | {2} | higher priority components of {4, 5} | lower priority components of {4, 5} |

In one example, to determine NZ coefficients in G1 and G2, the NZ LC coefficients are prioritized from high to low priority according to (l,i,m) index triplet. The $\lceil K_{NZ}/2 \rceil$ highest priority coefficients belong to G1 and the $\lfloor K_{NZ}/2 \rfloor$ lowest priority coefficients belong to G2. The priority level is calculated as $P(l,i,m)=2L \cdot v \cdot F_1(m)+v \cdot F_2(i)+l$, where $F_1$ and $F_2$ are fixed permutation functions for FD and SD indices. Note that $F_1(m)=m$ if there is no permutation in FD. Likewise, $F_2(i)=i$ if there is no permutation in SD. If priority levels of two coefficients $c_{l_1,i_1,m_1}$ and $c_{l_2,i_2,m_2}$ are such that $P(l_2,i_2,m_2)<P(l_1,i_1,m_1)$, then $c_{l_2,i_2,m_2}$ has a higher priority over $c_{l_1,i_1,m_1}$. In another example, the number of NZ coefficients in G1 and G2 are $N_1$ and $N_2$, respectively, where $N_1+N_2=K_{NZ}$.

In one example, a reference amplitude for weaker polarization is also included in G0. In another example, a reference amplitude for weaker polarization is also included in G1.

In one example (e.g., Ex 6-4, 6-8), the bitmap(s) are partitioned into two parts, 1st part and 2nd part, that may or may not be equal in length (size), and the 1st part of the bitmap(s) is included in G1 and the 2nd part of the bitmap(s) is included in G2.

In embodiment 6A, whether UCI part 2 comprises a single group (G0) or two groups (G0, G1) or three groups (G0, G1, G2) is determined implicitly based on the CSI part 2 including the second subset (S2). For example, when the second subset (S2) includes codebook indices 2-7, UCI part 2 comprises three groups (G0, G1, G2); when the second subset (S2) includes codebook indices 4-7, UCI part 2 comprises two groups (G0, G1); and when the second subset (S2) includes codebook indices 5-7, UCI part 2 comprises a single group (G0).

In embodiment 6B, whether UCI part 2 comprises a single group (G0) or two groups (G0, G1) or three groups (G0, G1, G2) is configured explicitly. This configuration can be separate via a dedicated higher layer RRC parameter. Or, this configuration can be jointly with a higher layer RRC parameter. Based on the configuration, the UE partitions the UCI part 2 into a single group (G0) or two groups (G0, G1) or three groups (G0, G1, G2).

In embodiment 7, when CSI reporting on PUSCH (or, optionally on PUCCH) comprises two parts, Part 1 CSI and Part 2 CSI, the UE may omit (hence does not report) a portion (or all) of the Part 2 CSI. Omission of Part 2 CSI is according to the priority order shown in Table 46, Table 47, or Table 48, where $N_{Rep}$ is the number of CSI reports configured to be carried on the PUSCH. Priority 0 is the highest priority and Priority x has a lower priority than Priority y if x>y, and the CSI report n corresponds to the CSI report with the nth smallest $Pri_{iCSI}(y,k,c,s)$ value among the $N_{Rep}$ CSI reports as defined in Subclause 5.2.5 of [REF8], which is copied below.

CSI reports are associated with a priority value $Pri_{iCSI}(y, k,c,s)=2 \cdot N_{cells} \cdot M_s \cdot y + N_{cells} \cdot M_s \cdot k + M_s \cdot c + s$ where y=0 for aperiodic CSI reports to be carried on PUSCH
y=1 for semi-persistent CSI reports to be carried on PUSCH, y=2 for semi-persistent CSI reports to be carried on PUCCH and y=3 for periodic CSI reports to be carried on PUCCH;

k=0 for CSI reports carrying L1-RSRP and k=1 for CSI reports not carrying L1-RSRP;

c is the serving cell index and $N_{cells}$ is the value of the higher layer parameter maxNrofServingCells;

s is the reportConfigID and $M_s$ is the value of the higher layer parameter maxNrofCSI-ReportConfigurations.

A first CSI report is said to have priority over second CSI report if the associated $Pri_{iCSI}(y,k,c,s)$ value is lower for the first report than for the second report.

When omitting Part 2 CSI information for a particular priority level, the UE shall omit all of the information at that priority level.

TABLE 46

Priority reporting levels for Part 2 CSI, one group (G0)

Priority 0:
Part 2 $G_0$ CSI for CSI report 1
Priority 1:
Part 2 $G_0$ CSI for CSI report 2
•
•
•
Priority $N_{Rep}$ − 2:
Part 2 $G_0$ CSI for CSI report $N_{Rep}$ −1
Priority $N_{Rep}$ − 1:
Part 2 $G_0$ CSI for CSI report $N_{Rep}$ Where $G_0$ = the single group comprising part 2 CSI, as proposed in this disclosure (cf. embodiments 1-4).

TABLE 47

Priority reporting levels for Part 2 CSI, two groups (G0, G1)

Priority 0:
Part 2 G0 CSI for CSI reports 1 to $N_{Rep}$
Priority 1:
Part 2 $G_1$ CSI for CSI report 1
Priority 2:
Part 2 $G_1$ CSI for CSI report 2
•
•
•
Priority $N_{Rep}$ −1:
Part 2 $G_1$ CSI for CSI report $N_{Rep}$ −1
Priority $N_{Rep}$:
Part 2 $G_1$ CSI for CSI report $N_{Rep}$ Where $G_0$ = the first group, and $G_1$ = the second group, as proposed in this disclosure (cf. embodiments 5).

TABLE 48

Priority reporting levels for Part 2 CSI, three groups
(G0, G1, G2)

Priority 0:
Part 2 G0 CSI for CSI reports 1 to $N_{Rep}$
Priority 1:
Part 2 $G_1$ CSI for CSI report 1
Priority 2:
Part 2 $G_2$ CSI for CSI report 1
Priority 3:
Part 2 $G_1$ CSI for CSI report 2
Priority 4:
Part 2 $G_2$ CSI for CSI report 2
•
•
•
Priority $2N_{Rep}$ −1 :
Part 2 $G_1$ CSI for CSI report $N_{Rep}$
Priority $2N_{Rep}$ :
Part 2 $G_2$ CSI for CSI report $N_{Rep}$ Where $G_0$ = the first group, $G_1$ = the second group, and $G_2$ = the third group, as proposed in this disclosure, (cf. embodiments 6).

Note that when UCI omission is according to the priority illustrated in Table 46, the whole CSI part 2 (comprising G0) of a CSI report can be omitted. When UCI omission is according to the priority illustrated in Table 47, either partial part 2 (comprising G1) or the whole part 2 (comprising (G0, G1)) of a CSI report can be omitted. When UCI omission is according to the priority illustrated in Table 48, either partial part 2 (comprising G2 or (G1, G2)) or the whole part 2 (comprising (G0, G1, G2)) of a CSI report can be omitted.

When the UE is scheduled to transmit a transport block on PUSCH multiplexed with a CSI report(s), Part 2 CSI is omitted only when $$\left\lceil (O_{CSI-2} + L_{CSI-2}) \cdot \beta_{offset}^{PUSCH} \cdot \frac{\sum_{l=0}^{N_{symb,all}^{PUSCH}-1} M_{sc}^{UCI}(l)}{\sum_{r=0}^{C_{UL-SCH}-1} K_r} \right\rceil$$

is larger than $$\left\lceil \alpha \cdot \sum_{l=0}^{N_{symb,all}^{PUSCH}-1} M_{SC}^{UCI}(l) \right\rceil - Q'_{ACK} - Q'_{CSI-1},$$

where parameters $O_{CSI-2}$, $L_{CSI-2}$, $\beta_{offset}^{PUSCH}$, $N_{symball}^{PUSCH}$, $M_{sc}^{UCI}(l)$, $C_{UL-SCH}$, $K_r$, $Q'_{CSI-1}$, $Q'_{ACK}$ and α are defined in section 6.3.2.4 of [REF7].

Part 2 CSI is omitted level by level, beginning with the lowest priority level until the lowest priority level is reached which causes the $$\left\lceil (O_{CSI-2} + L_{CSI-2}) \cdot \beta_{offset}^{PUSCH} \cdot \frac{\sum_{l=0}^{N_{symb,all}^{PUSCH}-1} M_{sc}^{UCI}(l)}{\sum_{r=0}^{C_{UL-SCH}-1} K_r} \right\rceil$$

to be less than or equal to $$\left\lceil \alpha \cdot \sum_{l=0}^{N_{symb,all}^{PUSCH}-1} M_{SC}^{UCI}(l) \right\rceil - Q'_{ACK} - Q'_{CSI-1}.$$

When part 2 CSI is transmitted on PUSCH with no transport block, lower priority bits are omitted until Part 2 CSI code rate is below a threshold code rate $c_T$ lower than one, where $$C_T = \frac{R}{\beta_{offset}^{CSI-part2}}$$

$\beta_{offset}^{CSI-part2}$ is the CSI offset value from Table 9.3-2 of [REF9]

R is signaled code rate in DCI

Any of the above variation embodiments can be utilized independently or in combination with at least one other variation embodiment.

Figure 17:
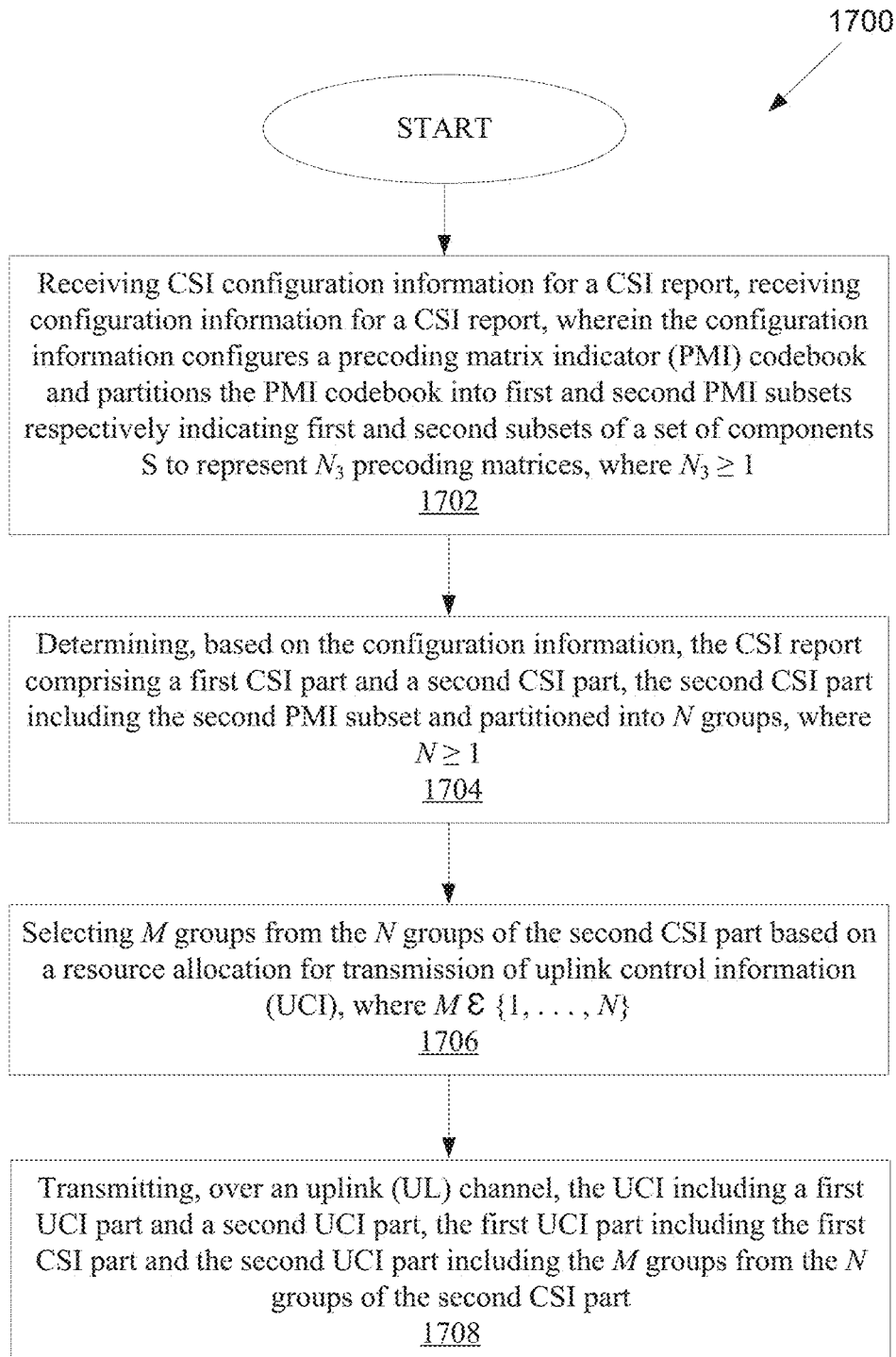
FIG. 17 illustrates a flow chart of a method for transmitting an UL transmission including CSI reporting, as may be performed by a UE according to embodiments of the present disclosure.

FIG. 17 illustrates a flow chart of a method 1700 for operating a user equipment (UE) for channel state information (CSI) reporting in a wireless communication system, as may be performed by a UE such as UE 116, according to embodiments of the present disclosure. The embodiment of the method 1700 illustrated in FIG. 17 is for illustration only. FIG. 17 does not limit the scope of this disclosure to any particular implementation.

As illustrated in FIG. 17, the method 1700 begins at step 1702. In step 1702, the UE (e.g., 111-116 as illustrated in FIG. 1) receives configuration information for a CSI report, where the configuration information configures a precoding matrix indicator (PMI) codebook and partitions the PMI codebook into first and second PMI subsets respectively indicating first and second subsets of a set of components S to represent $N_3$ precoding matrices, where $N_3 \geq 1$.

In step 1704, the UE determines, based on the configuration information, the CSI report comprising a first CSI part and a second CSI part, the second CSI part including the second PMI subset and partitioned into N groups, where $N \geq 1$.

In step 1706, the UE selects M groups from the N groups of the second CSI part based on a resource allocation for transmission of uplink control information (UCI), where $M \in \{1, \ldots, N\}$.

In step 1708, the UE transmits, over an uplink (UL) channel, the UCI including a first UCI part and a second UCI part, the first UCI part including the first CSI part and the second UCI part including the M groups from the N groups of the second CSI part.

In one embodiment, a value of N is configured via higher layer signaling.

In one embodiment, a value of N is determined based on the second PMI subset indicating the second subset of components.

In one embodiment, for each layer $l=1, \ldots, v$, where $v \leq 1$ is a rank value, the set of components S comprises all or some of $\{C1, \ldots, C6\}$, where: C1: a set of spatial domain (SD) port selection vectors $\{a_i\}$ and a set of frequency domain (FD) port selection vectors $\{b_f\}$, where a port selection vector has one entry equal to 1 and remaining entries equal to 0, C2: indices of non-zero (NZ) coefficients, C3: an index of a strongest coefficient, C4: a reference amplitude, C5: amplitudes of NZ coefficients, and C6: phases of the NZ coefficients.

In one embodiment, the sets of SD and FD port selection vectors are either separate as $\{a_i\}_{i=0}^{L-1}$ and $\{b_f\}_{f=0}^{M-1}$, where L and M are number of SD and FD port selection vectors, respectively, or joint as a set of port selection vector pairs $\{(a_i,b_i)\}_{i=0}^{X-1}$, where X is a number of port selection vector pairs.

In one embodiment, when a value of N=1, the second CSI part is a single group (Group 0) that includes the second PMI subset indicating the second subset of components obtained from {C1, . . . , C6}.

In one embodiment, when a value of N=2, the second CSI part is partitioned into two groups (Group 0, Group 1), each group including a part of the second PMI subset, and the second PMI subset indicating the second subset of components obtained from {C1, . . . , C6}.

In one embodiment, when a value of N=3, the second CSI part is partitioned into three groups (Group 0, Group 1, Group 2), each group including a part of the second PMI subset, and the second PMI subset indicating the second subset of components obtained from {C1, . . . , C6}, wherein Group 1 and Group 2 respectively include higher priority and lower priority elements of {C5, C6} or {C2, C5, C6}.

Figure 18:
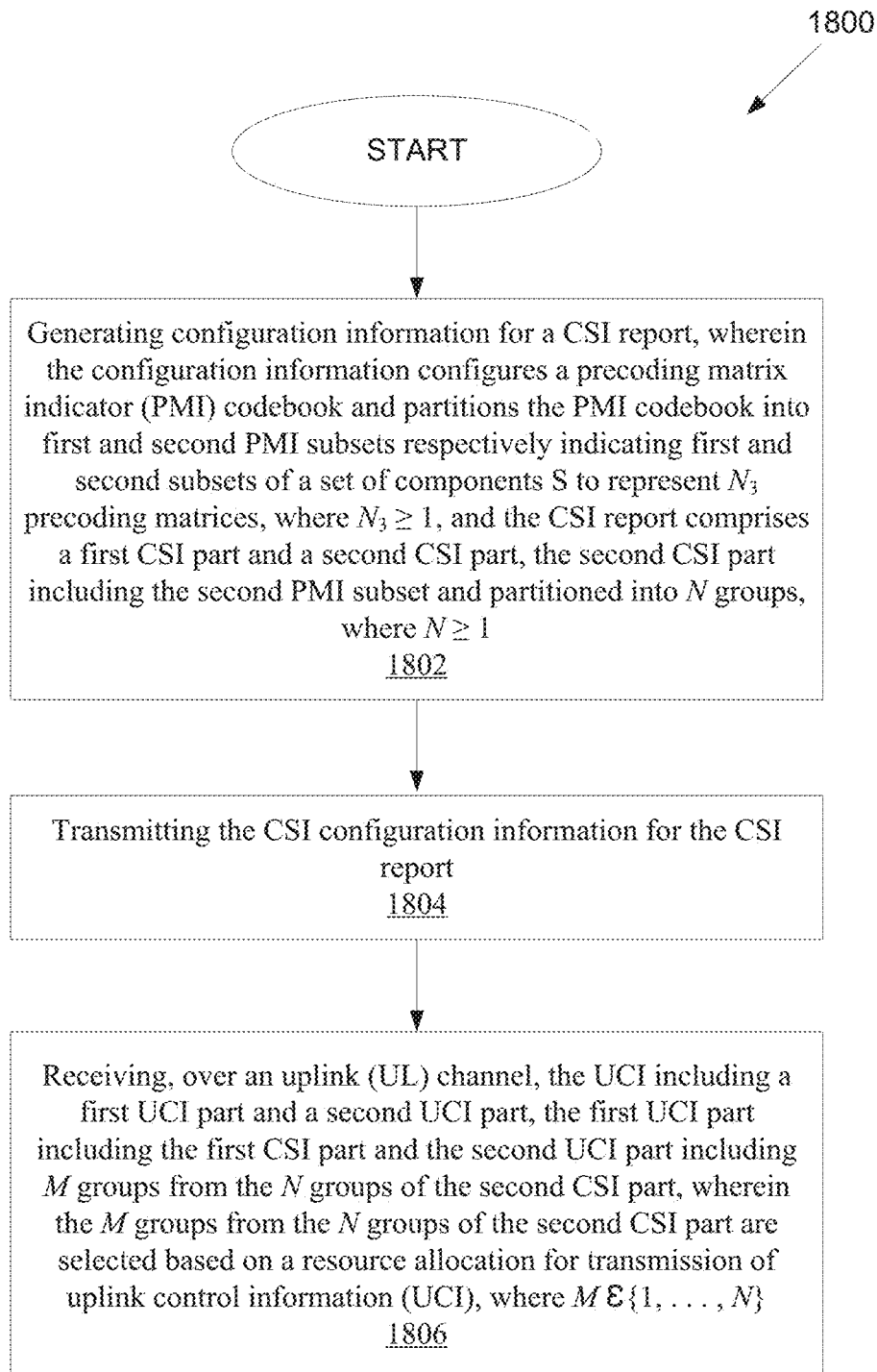
FIG. 18 illustrates a flow chart of another method for receiving an UL transmission including CSI reporting, as may be performed by a BS, according to embodiments of the present disclosure.

FIG. 18 illustrates a flow chart of another method 1800, as may be performed by a base station (BS) such as BS 102, according to embodiments of the present disclosure. The embodiment of the method 1800 illustrated in FIG. 18 is for illustration only. FIG. 18 does not limit the scope of this disclosure to any particular implementation.

As illustrated in FIG. 18, the method 1800 begins at step 1802. In step 1802, the BS (e.g., 101-103 as illustrated in FIG. 1), generates configuration information for a channel state information (CSI) report, where: the configuration information configures a precoding matrix indicator (PMI) codebook and partitions the PMI codebook into first and second PMI subsets respectively indicating first and second subsets of a set of components S to represent $N_3$ precoding matrices, where $N_3 \geq 1$, and the CSI report comprises a first CSI part and a second CSI part, the second CSI part including the second PMI subset and partitioned into N groups, where $N \geq 1$.

In step 1804, the BS transmits the CSI configuration information for the CSI report.

In step 1806, the BS receives, over an uplink (UL) channel, uplink control information (UCI), the UCI including a first UCI part and a second UCI part, the first UCI part including the first CSI part and the second UCI part including M groups from the N groups of the second CSI part, wherein the M groups from the N groups of the second CSI part are selected based on a resource allocation for transmission of the UCI, where $M \in \{1, \ldots, N\}$.

In one embodiment, a value of N is configured via higher layer signaling.

In one embodiment, a value of N is determined based on the second PMI subset indicating the second subset of components.

In one embodiment, for each layer l=1, . . . , v, where $v \geq 1$ is a rank value, the set of components S comprises all or some of {C1, . . . , C6}, where: C1: a set of spatial domain (SD) port selection vectors $\{a_i\}$ and a set of frequency domain (FD) port selection vectors $\{b_f\}$, where a port selection vector has one entry equal to 1 and remaining entries equal to 0, C2: indices of non-zero (NZ) coefficients, C3: an index of a strongest coefficient, C4: a reference amplitude, C5: amplitudes of NZ coefficients, and C6: phases of the NZ coefficients.

In one embodiment, the sets of SD and FD port selection vectors are either separate as $\{a_i\}_{i=0}^{L-1}$ and $\{b_f\}_{f=0}^{M-1}$, where L and M are number of SD and FD port selection vectors, respectively, or joint as a set of port selection vector pairs $\{(a_i, b_i)\}_{i=0}^{X-1}$, where X is a number of port selection vector pairs.

In one embodiment, when a value of N=1, the second CSI part is a single group (Group 0) that includes the second PMI subset indicating the second subset of components obtained from {C1, . . . , C6}.

In one embodiment, when a value of N=2, the second CSI part is partitioned into two groups (Group 0, Group 1), each group including a part of the second PMI subset, and the second PMI subset indicating the second subset of components obtained from {C1, . . . , C6}.

In one embodiment, when a value of N=3, the second CSI part is partitioned into three groups (Group 0, Group 1, Group 2), each group including a part of the second PMI subset, and the second PMI subset indicating the second subset of components obtained from {C1, . . . , C6}, wherein Group 1 and Group 2 respectively include higher priority and lower priority elements of {C5, C6} or {C2, C5, C6}.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
   a transceiver configured to receive channel state information (CSI) report configuration information; and
   a processor operably coupled to the transceiver, the processor configured to:
      determine, based on the CSI report configuration information, a first CSI part and a second CSI part, wherein the second CSI part includes CSI for one or more CSI reports and the CSI for the one or more CSI reports is partitioned into three groups, (G0, G1, G2); and
      determine at least one group of the second CSI part to include in uplink control information (UCI) based on (i) a CSI reporting priority and (ii) a resource allocation for transmission of the UCI,
   wherein the transceiver is further configured to transmit the UCI including a first UCI part and a second UCI part, the first UCI part including the first CSI part and the second UCI part including the at least one determined group of the second CSI part,
   wherein G0 includes at most one of a first indicator and a second indicator, and
   wherein the first indicator indicates a plurality of spatial domain vectors and the second indicator indicates a plurality of frequency domain vectors.

2. The UE of claim 1, wherein G0 includes the first indictor and does not include the second indictor.

3. The UE of claim 1, wherein G0 includes the second indictor and does not include the first indictor.

4. The UE of claim 1, wherein G0 includes neither of the first indictor and the second indictor.

5. The UE of claim 1, wherein the at least one determined group corresponds to G0, or (G0, G1), or (G0, G1, G2).

6. The UE of claim 1, wherein the CSI reporting priority corresponds to:

| |
|---|
| Priority 0: first groups (G0) for the one or more CSI reports |
| Priority 1: second group (G1) of a first CSI report among the one or more CSI reports |
| Priority 2: third group (G2) of the first CSI report among the one or more CSI reports |
| ... |
| Priority 2N − 1: second group (G1) of a Nth CSI report among the one or more of CSI reports |
| Priority 2N: third group (G2) of the Nth CSI report among the one or more of CSI reports |

, where priority 0 is a highest priority and priority 2N is a lowest priority.

7. The UE of claim 1, wherein for each layer:
G0 includes a strongest coefficient indicator,
G1 includes a first subset of amplitude coefficient indicators, a first subset of phase coefficient indicators, and a first subset of bitmap indicators, and
G2 includes a second subset of amplitude coefficient indicators, a second subset of phase coefficient indicators, and a second subset of bitmap indicators,
where the first and second subsets of amplitude coefficients indicators, phase coefficients indicators, and bitmap indicators are based on a priority value P associated with each of 2LM coefficients, and
wherein the priority value P is determinable based on:

$$P(l,i,m)=2 \cdot L \cdot v \cdot m + v \cdot i + l,$$

where:
l=1, ..., ν,
ν is a number of layers,
i=0, ..., 2L−1,
L is a number of spatial domain vectors,
m=0, ..., M−1, and
M is a number of frequency domain vectors.

8. A base station (BS) comprising:
a transceiver configured to:
transmit channel state information (CSI) report configuration information indicating a first CSI part and a second CSI part; and
receive uplink control information (UCI) including a first UCI part and a second UCI part, the first UCI part including the first CSI part and the second UCI part including at least one group of the second CSI part,
wherein the second CSI part includes CSI for one or more CSI reports and the CSI for the one or more CSI reports is partitioned into three groups, (G0, G1, G2),
wherein the at least one group of the second CSI part included in the UCI is determined based on (i) a CSI reporting priority and (ii) a resource allocation for transmission of the UCI,
wherein G0 includes at most one of a first indicator and a second indicator, and
wherein the first indicator indicates a plurality of spatial domain vectors and the second indicator indicates a plurality of frequency domain vectors.

9. The BS of claim 8, wherein G0 includes the first indictor and does not include the second indictor.

10. The BS of claim 8, wherein G0 includes the second indictor and does not include the first indictor.

11. The BS of claim 8, wherein G0 includes neither of the first indictor and the second indictor.

12. The BS of claim 8, wherein the at least one determined group corresponds to G0, or (G0, G1), or (G0, G1, G2).

13. The BS of claim 8, wherein the CSI reporting priority corresponds to:

| |
|---|
| Priority 0: first groups (G0) for the one or more CSI reports |
| Priority 1: second group (G1) of a first CSI report among the one or more CSI reports |
| Priority 2: third group (G2) of the first CSI report among the one or more CSI reports |
| ... |
| Priority 2N − 1: second group (G1) of a Nth CSI report among the one or more of CSI reports |
| Priority 2N: third group (G2) of the Nth CSI report among the one or more of CSI reports |

, where priority 0 is a highest priority and priority 2N is a lowest priority.

14. The BS of claim 8, wherein for each layer:
G0 includes a strongest coefficient indicator,
G1 includes a first subset of amplitude coefficient indicators, a first subset of phase coefficient indicators, and a first subset of bitmap indicators, and
G2 includes a second subset of amplitude coefficient indicators, a second subset of phase coefficient indicators, and a second subset of bitmap indicators,
where the first and second subsets of amplitude coefficients indicators, phase coefficients indicators, and bitmap indicators are based on a priority value P associated with each of 2LM coefficients, and
wherein the priority value P is determinable based on:

$$P(l,i,m)=2 \cdot L \cdot v \cdot m + v \cdot i + l,$$

where:
l=1, ..., ν,
ν is a number of layers,
i=0, ..., 2L−1,
L is a number of spatial domain vectors,
m=0, ..., M−1, and
M is a number of frequency domain vectors.

15. A method for operating a user equipment (UE), the method comprising:
receiving channel state information (CSI) report configuration information;
determining, based on the CSI report configuration information, a first CSI part and a second CSI part, wherein the second CSI part includes CSI for one or more CSI reports and the CSI for the one or more CSI reports is partitioned into three groups, (G0, G1, G2);
determine at least one group of the second CSI part to include in uplink control information (UCI) based on (i) a CSI reporting priority and (ii) a resource allocation for transmission of the UCI; and
transmitting the UCI including a first UCI part and a second UCI part, the first UCI part including the first CSI part and the second UCI part including the at least one determined group of the second CSI part,
wherein G0 includes at most one of a first indicator and a second indicator, and
wherein the first indicator indicates a plurality of spatial domain vectors and the second indicator indicates a plurality of frequency domain vectors.

16. The method of claim 15, wherein G0 includes the first indictor and does not include the second indictor.

17. The method of claim 15, wherein G0 includes the second indictor and does not include the first indictor.

18. The method of claim 15, wherein G0 includes neither of the first indictor and the second indictor.

19. The method of claim 15, wherein the at least one determined group corresponds to G0, or (G0, G1), or (G0, G1, G2).

20. The method of claim 15, wherein the CSI reporting priority corresponds to:

> Priority 0: first groups (G0) for the one or more CSI reports
> Priority 1: second group (G1) of a first CSI report among the one or more CSI reports
> Priority 2: third group (G2) of the first CSI report among the one or more CSI reports
> . . .
> Priority 2N − 1: second group (G1) of a Nth CSI report among the one or more of CSI reports
> Priority 2N: third group (G2) of the Nth CSI report among the one or more of CSI reports , where priority 0 is a highest priority and priority 2N is a lowest priority.

* * * * *